(12) United States Patent
Shenoi et al.

(10) Patent No.: US 9,432,282 B2
(45) Date of Patent: Aug. 30, 2016

(54) NETWORK-BASED HYPERSPEED COMMUNICATION AND DEFENSE

(75) Inventors: Sujeet Shenoi, Tulsa, OK (US); Daniel Guernsey, Broken Arrow, OK (US); Mason Rice, Alachua, FL (US)

(73) Assignee: The University of Tulsa, Tulsa, OK (US)

( * ) Notice: Subject to any disclaimer, the term of this patent is extended or adjusted under 35 U.S.C. 154(b) by 403 days.

(21) Appl. No.: 14/000,449

(22) PCT Filed: Jul. 1, 2011

(86) PCT No.: PCT/US2011/042817
§ 371 (c)(1),
(2), (4) Date: Aug. 20, 2013

(87) PCT Pub. No.: WO2012/115679
PCT Pub. Date: Aug. 30, 2012

(65) Prior Publication Data
US 2013/0339545 A1   Dec. 19, 2013

Related U.S. Application Data

(60) Provisional application No. 61/446,381, filed on Feb. 24, 2011, provisional application No. 61/453,260, filed on Mar. 16, 2011.

(51) Int. Cl.
*H04L 12/725* (2013.01)
*H04L 12/40* (2006.01)
*H04L 12/707* (2013.01)
(Continued)

(52) U.S. Cl.
CPC .......... *H04L 45/30* (2013.01); *H04L 12/40163* (2013.01); *H04L 45/22* (2013.01); *H04L 45/24* (2013.01); *H04L 47/24* (2013.01);
(Continued)

(58) Field of Classification Search
CPC ....... H04L 47/10; H04L 63/30; H04L 63/10; H04L 63/1458; H04L 63/1416; H04L 63/308; H04L 63/14; H04L 63/00
USPC ........................................................ 709/240
See application file for complete search history.

(56) References Cited

U.S. PATENT DOCUMENTS 6,795,918 B1    9/2004  Trolan
7,295,516 B1 *  11/2007  Ye ........................... H04L 47/10
                                                            370/232

(Continued)

OTHER PUBLICATIONS

Monitoring and Early Warning for Internet Worms; Cliff Changchun Zou; Oct. 27-30, CCS'03, Oct. 2003, Washington, DC, USA.*

(Continued)

*Primary Examiner* — Kevin Bates
*Assistant Examiner* — Mark A Scott
(74) *Attorney, Agent, or Firm* — McAfee & Taft, A Professional Corporation

(57) ABSTRACT

This invention relates to the use of optimal (hyperspeed) paths for command and control (and other high priority) traffic and suboptimal (slower) paths for all other traffic in order to implement sophisticated network service differentiation and defensive techniques. A reaction time window is created to ensure that packets sent along hyperspeed paths can arrive sufficiently in advance of malicious traffic in order to alert network devices and initiate defensive actions. Assortments of defensive options are available to networks employing the invention and the inventive algorithms.

35 Claims, 20 Drawing Sheets

(51) Int. Cl.
  *H04L 12/851* (2013.01)
  *H04L 12/723* (2013.01)
  *H04L 29/06* (2006.01)

(52) U.S. Cl.
  CPC ....... *H04L63/1408* (2013.01); *H04L 63/1416* (2013.01); *H04L 45/50* (2013.01); *H04L 63/0263* (2013.01)

(56) References Cited

U.S. PATENT DOCUMENTS

| | | | |
|---|---|---|---|
| 2002/0166063 A1* | 11/2002 | Lachman, III | H04L 63/0263 726/23 |
| 2002/0178383 A1* | 11/2002 | Hrabik | H04L 63/1433 726/4 |
| 2005/0141423 A1* | 6/2005 | Lee | H04L 43/026 370/232 |
| 2005/0157723 A1 | 7/2005 | Kim et al. | |
| 2005/0180416 A1* | 8/2005 | Jayawardena | H04L 45/00 370/389 |
| 2006/0010389 A1* | 1/2006 | Rooney | H04L 63/1425 715/736 |
| 2006/0041667 A1* | 2/2006 | Ahn | H04L 12/5693 709/229 |
| 2006/0101516 A1* | 5/2006 | Sudaharan | H04L 63/0263 726/23 |
| 2007/0011741 A1* | 1/2007 | Robert | H04L 12/2602 726/22 |
| 2007/0130619 A1* | 6/2007 | Reams, III | H04L 63/1425 726/13 |
| 2007/0192863 A1* | 8/2007 | Kapoor | G06F 9/505 726/23 |
| 2007/0300298 A1* | 12/2007 | Goranson | H04L 63/1416 726/22 |
| 2008/0062891 A1* | 3/2008 | Van der Merwe | H04L 45/04 370/254 |
| 2008/0144493 A1 | 6/2008 | Yeh | |
| 2008/0262990 A1* | 10/2008 | Kapoor | G06F 9/505 706/20 |
| 2009/0060065 A1 | 3/2009 | Walker et al. | |
| 2009/0094691 A1* | 4/2009 | Dargis | H04L 63/0236 726/11 |
| 2009/0254663 A1 | 10/2009 | Alperovitch et al. | |
| 2009/0288165 A1* | 11/2009 | Qiu | G06F 21/552 726/23 |
| 2010/0008240 A1* | 1/2010 | Ee | H04L 12/2697 370/252 |
| 2010/0031358 A1* | 2/2010 | Elovici | H04L 12/2602 726/24 |
| 2010/0103837 A1* | 4/2010 | Jungck | H04L 29/12066 370/252 |
| 2010/0262703 A1* | 10/2010 | Faynberg | H04L 63/0815 709/229 |
| 2010/0312877 A1* | 12/2010 | Xie | H04L 63/1408 709/224 |
| 2011/0119761 A1* | 5/2011 | Wang | H04L 63/1458 726/23 |
| 2011/0141900 A1* | 6/2011 | Jayawardena | H04L 43/028 370/237 |
| 2011/0286342 A1* | 11/2011 | Ee | H04L 45/58 370/252 |
| 2012/0082163 A1* | 4/2012 | Esteve Rothenberg | H04L 45/00 370/392 |
| 2012/0147753 A1* | 6/2012 | Jayawardena | H04L 41/5022 370/238 |

OTHER PUBLICATIONS

Monitoring and Early Detection for Internet Worms; Cliff C. Zou; 2004.*
International Search Report in PCT/US2011/042817, dated Nov. 16, 2011, The University of Tulsa.
Written Opinion of the International Searching Authority, dated Nov. 16, 2016, The University of Tulsa.
International Preliminary Report on Patentability, dated Mar. 22, 2013, The University of Tulsa.
Examiner's Report in Canadian Patent Application No. 2,827,941, mailed Sep. 30, 2014.
Examiner's Report in Canadian Patent Application No. 2,827,941, mailed Oct. 19, 2015.

\* cited by examiner

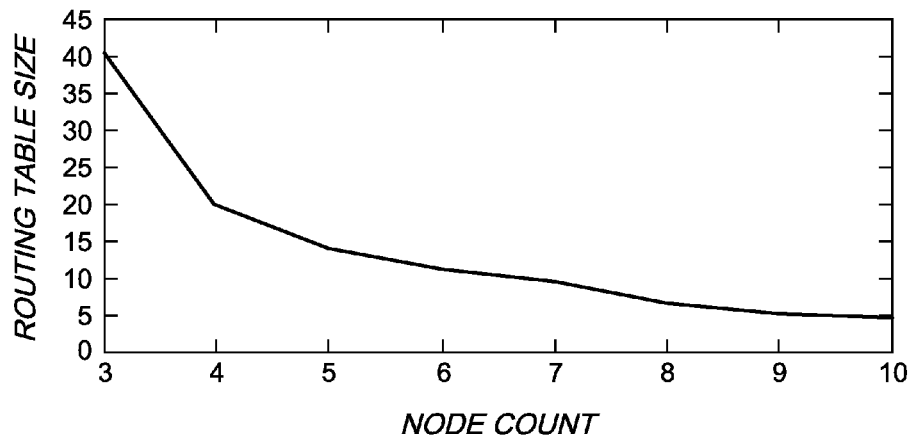
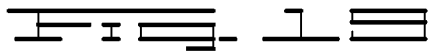
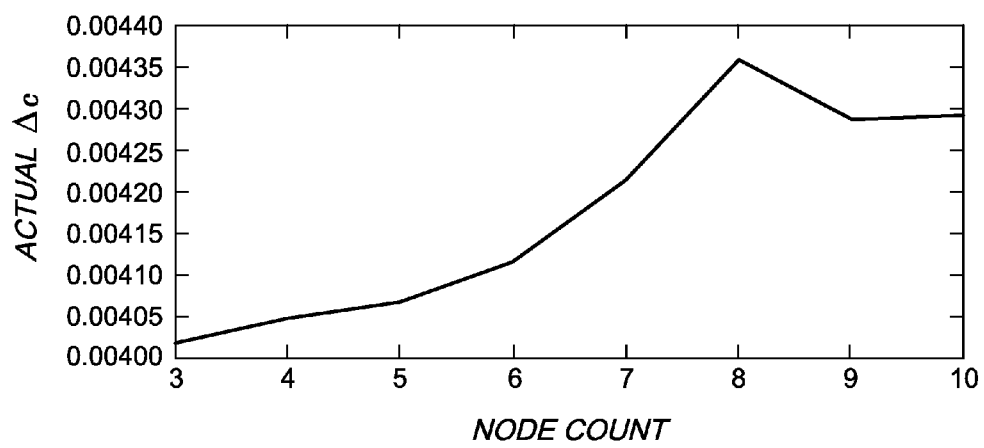
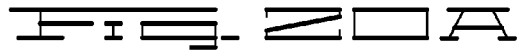

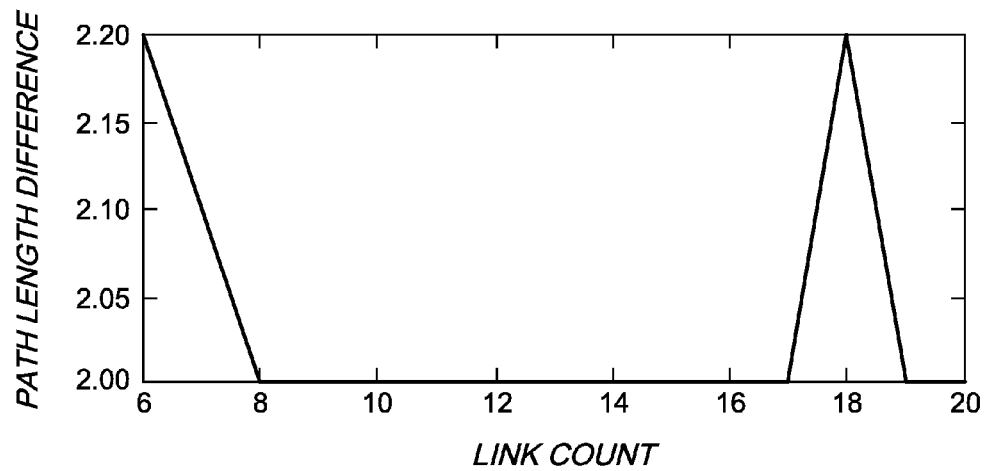
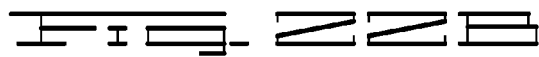
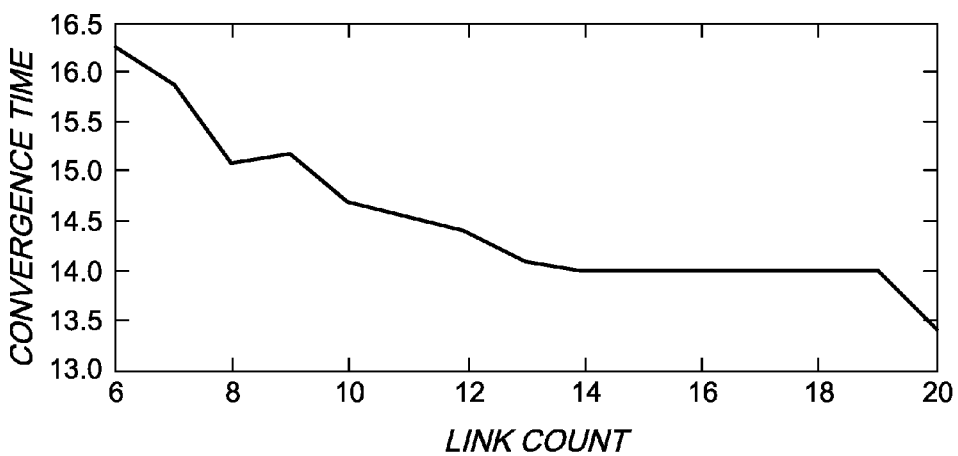

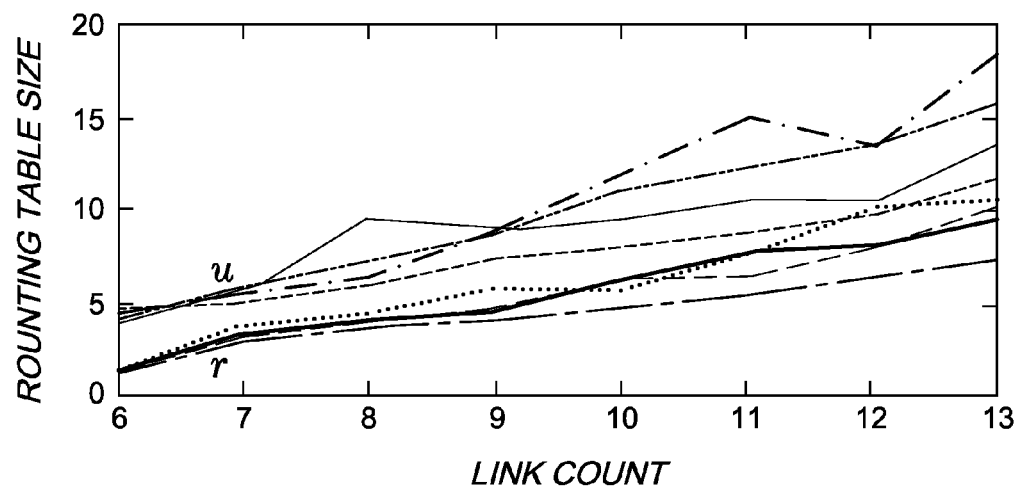
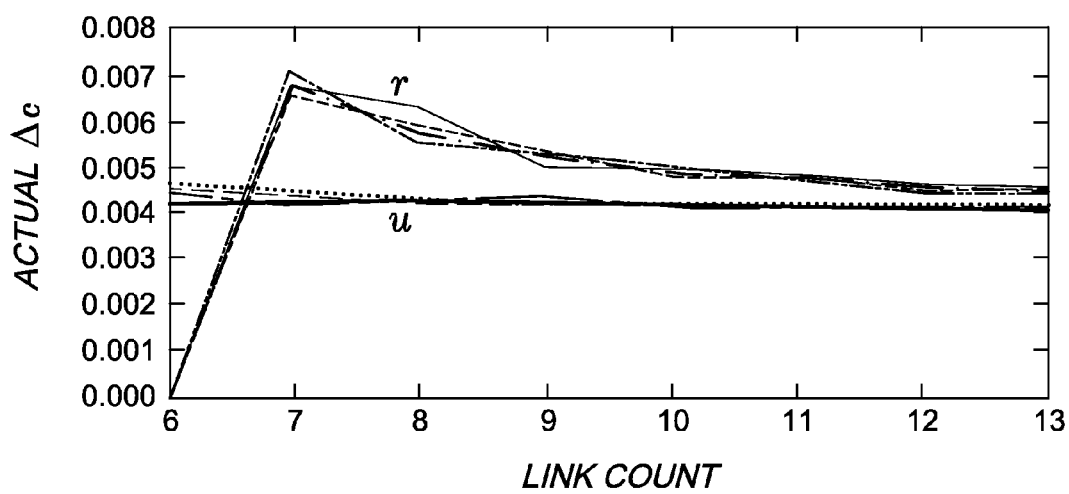
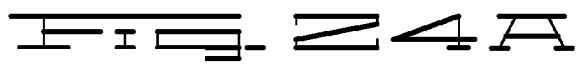

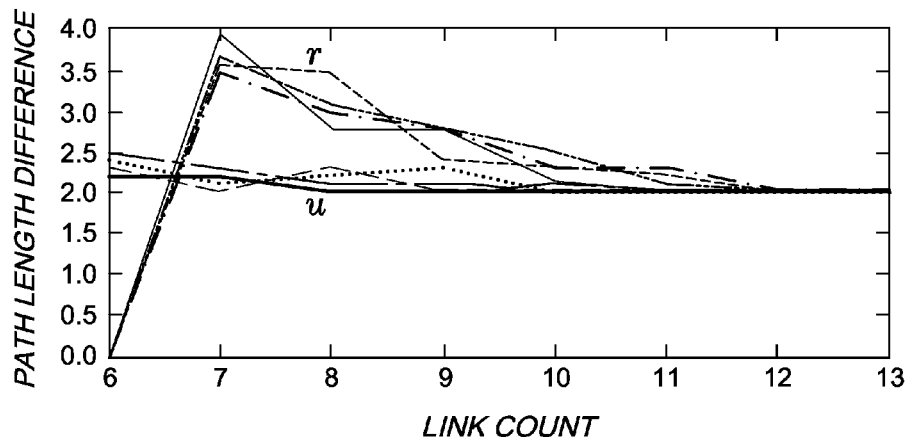
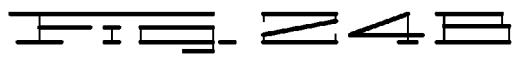
FIG. 24B
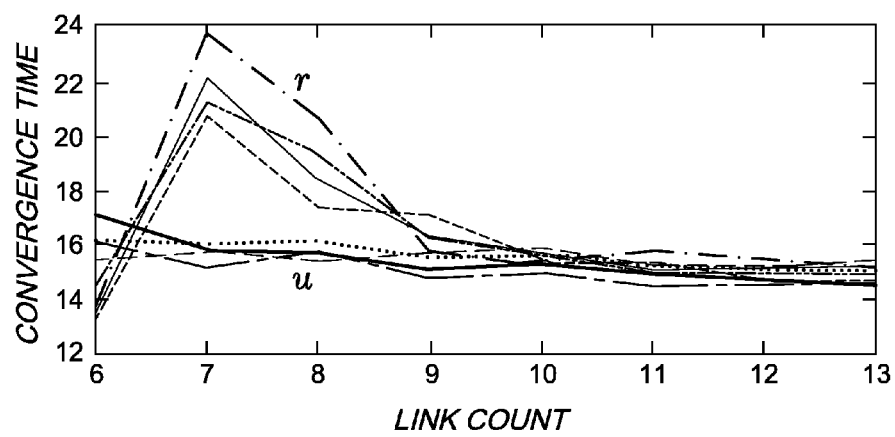
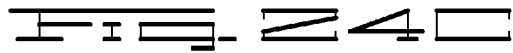
FIG. 24C

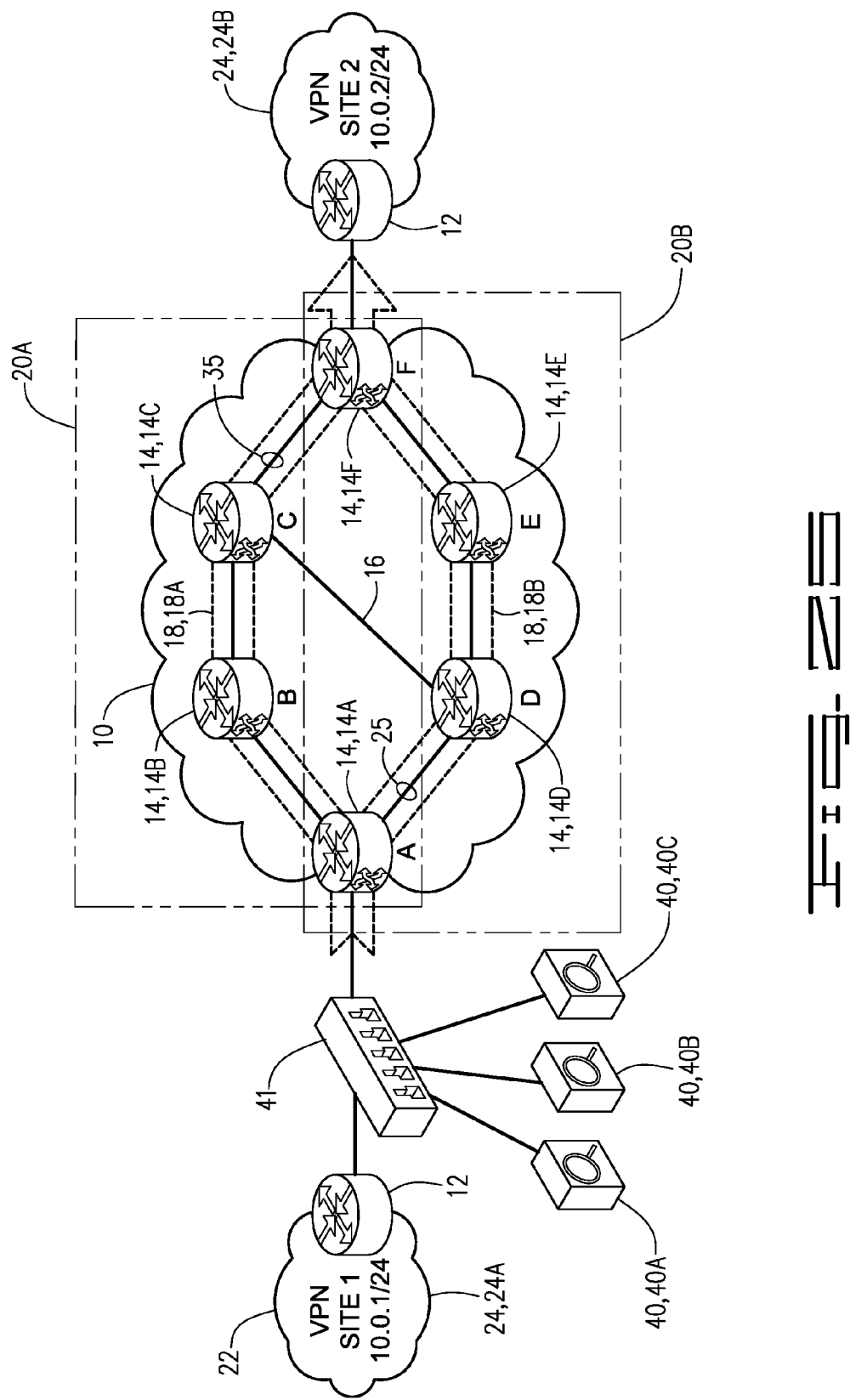

NETWORK-BASED HYPERSPEED COMMUNICATION AND DEFENSE

CROSS-REFERENCE TO RELATED APPLICATIONS

This application is a national phase entry of PCT/US2011/0042817 entitled NETWORK-BASED HYPERSPEED COMMUNICATION AND DEFENSE filed Jul. 1, 2011, which claims priority to U.S. Provisional Application Ser. No. 61/453,260 entitled NETWORK-BASED HYPERSPEED COMMUNICATION AND DEFENSE filed on Mar. 16, 2011, and U.S. Provisional Application Ser. No. 61/446,381 entitled NETWORK-BASED HYPERSPEED COMMUNICATION AND DEFENSE, filed on Feb. 24, 2011, both of which are each incorporated herein in their entireties.

BACKGROUND OF THE INVENTION

In all situations, early warning of an attack offers the best chance of defense against that attack. Having detailed information about the attack before it occurs provides a defender with more options to use in his or her defense. These principles are true regardless of when or how an attack occurs. When armed with early warning and information, effective and preemptive countermeasures may be efficiently employed. Unfortunately, the configuration of a network and the speed of electronic communications often prevent any substantive early warning or preemptive informational analysis.

The most common countermeasure employed by networks limits the speed of ingress (incoming) electronic communications by forcing the traffic through one or more filters at the ingress point in order to detect malicious or suspicious traffic. Currently, when malicious or suspicious traffic is identified, the particular signal or packet is quarantined. Each subsequent filter then adds another layer of delay, thereby imposing additional time costs on network traffic and electronic communications. Ultimately, malicious and suspicious attacks on computer networks are a common occurrence causing significant performance and financial loss, while redirecting resources and budgets. The alternative to filtering is to allow network security systems to react to an attack.

Users of networks want the fastest communication speeds for their signals and data packets as they transit the network. This is the optimal communications path. The competing needs for network security against the end users' need for fast communications are one of the many balancing efforts network administrators face. Multiprotocol label switching (MPLS) networks are one solution where balancing the competing needs provides additional opportunities to satisfy the competing demands of security and speed.

MPLS networks are quickly becoming the standard for high-speed network backbones. MPLS networks used by major service providers offer a variety of high-priority paths (optimal) and low-priority paths (suboptimal) for customer traffic based on service level agreements. Thus, network administrators can meet the end users' needs by modifying the choices the end user makes and pays for.

For each MPLS network, there is at least one optimal path corresponding to the optimum speed for each signal or packet. Similarly, there are usually several suboptimal paths corresponding to the suboptimal speeds of signals or packets, the suboptimal speeds being less than the optimum speed. Current MPLS network security limits all of these transmissions to some value below the absolute fastest or optimal speed technologically available, thereby causing the performance of the network to be slower.

Because MPLS networks have a plurality of nodes, there are numerous routes and paths electronic communication signals can travel. This also means networks have numerous ingress points, routes and paths for the malicious and suspicious traffic to traverse. Because each node adds the burden of filtering an electronic signal, the speed of the network dramatically slows down, and the electronic signal travels at an extremely low, suboptimal speed. Optimization of the system also suffers filtration limits. However, without filtration systems, the network and its nodes have limited ability to react to threats when attacked.

The foregoing issues show a need for one or more ways to protect networks, optimize the electronic signal speed, and provide early warning messages without the burden of multiple filters.

SUMMARY OF THE INVENTION

In one aspect, the following invention provides for a method for communicating a high-priority signal across a network ahead of a lower-priority signal. The method comprises the steps of:
 a. assigning a priority to each signal entering the network
 b. identifying any harmful signal associated with any of the signals entering the network;
 c. generating a high-priority signal in response to the identification of a harmful signal;
 d. identifying and selecting at least one defensive technique for the network;
 e. defining a plurality of electronic communication paths, each path capable of carrying a plurality of signals, wherein the step of defining the plurality of paths identifies at least one optimal communication path and at least one suboptimal communication path corresponding with the selected defensive technique;
 f. electronically communicating the high-priority signal along the optimal communication path; and
 g. delivering the high-priority signal along the optimal communication path to the desired destination prior to delivering any of the lower priority signals.

In another aspect, the invention provides a method for flexible high-priority electronic communication suitable for communicating a plurality of signals across a network, the network having a plurality of electronic communication paths and each signal having a signal priority. The method comprises the steps of:
 a. determining a priority for each signal, wherein at least one signal is a high-priority signal;
 b. selecting at least one defensive technique, thereby defining a plurality of paths for electronically communicating the signals; and
 c. employing one or more of the selected defensive techniques to optimize the electronic communication of the high-priority signal along at least one of the paths, thereby providing delivery of a transmitted high-priority signal faster than transmitted lower-priority signals to a desired destination.

In yet another aspect, the invention provides a method for delivering high-priority signals over a network faster than lower-priority signals. The method comprises:
 a. identifying a plurality of paths;
 b. ranking each of the plurality of paths from an optimal path to at least one suboptimal path, wherein each path includes an origination node and a termination node;

c. identifying a reaction window, the reaction window defining a desired time difference between the optimal path and suboptimal paths;
d. selecting the optimal path and at least one suboptimal path from the plurality of paths satisfying the reaction window, the selection determined by the reaction window for each origination node and termination node; and
e. delivering the high-priority signal from the origination node to the termination node along the selected path.

Numerous objects and advantages of the invention will become apparent as the following detailed description of the preferred embodiments is read in conjunction with the drawings, which illustrate such embodiments.

BRIEF DESCRIPTION OF THE DRAWINGS

FIG. 16A depicts a graph of trends in performance metrics for actual $\Delta c$ values versus increasing target $\Delta c$ values.

FIG. 16B depicts a graph of trends in performance metrics for path length difference values versus increasing target $\Delta c$ values.

FIG. 16C depicts a graph of trends in performance metrics for convergence time values versus increasing target $\Delta c$ values.

FIG. 19 depicts a graph of routing table size versus node count.

FIG. 20A depicts a graph of actual $\Delta c$ values versus node count.

FIG. 22B depicts a graph of path length difference values versus link count.

FIG. 22C depicts a graph of convergence time values versus link count.

FIG. 23 depicts a graph of routing table size versus link count with a restriction on the number of entries in the routing table.

FIG. 24A depicts a graph of actual $\Delta c$ values versus link count with a restriction on the number of entries in the routing table.

FIG. 24B depicts a graph of path length difference values versus link count with a restriction on the number of entries in the routing table t.

FIG. 24C depicts a graph of convergence time values versus link count with a restriction on the number of entries in the routing table.

FIG. 25 depicts an illustrative embodiment of the inventive method.

DETAILED DESCRIPTION

Inventive Overview

Figure 1:
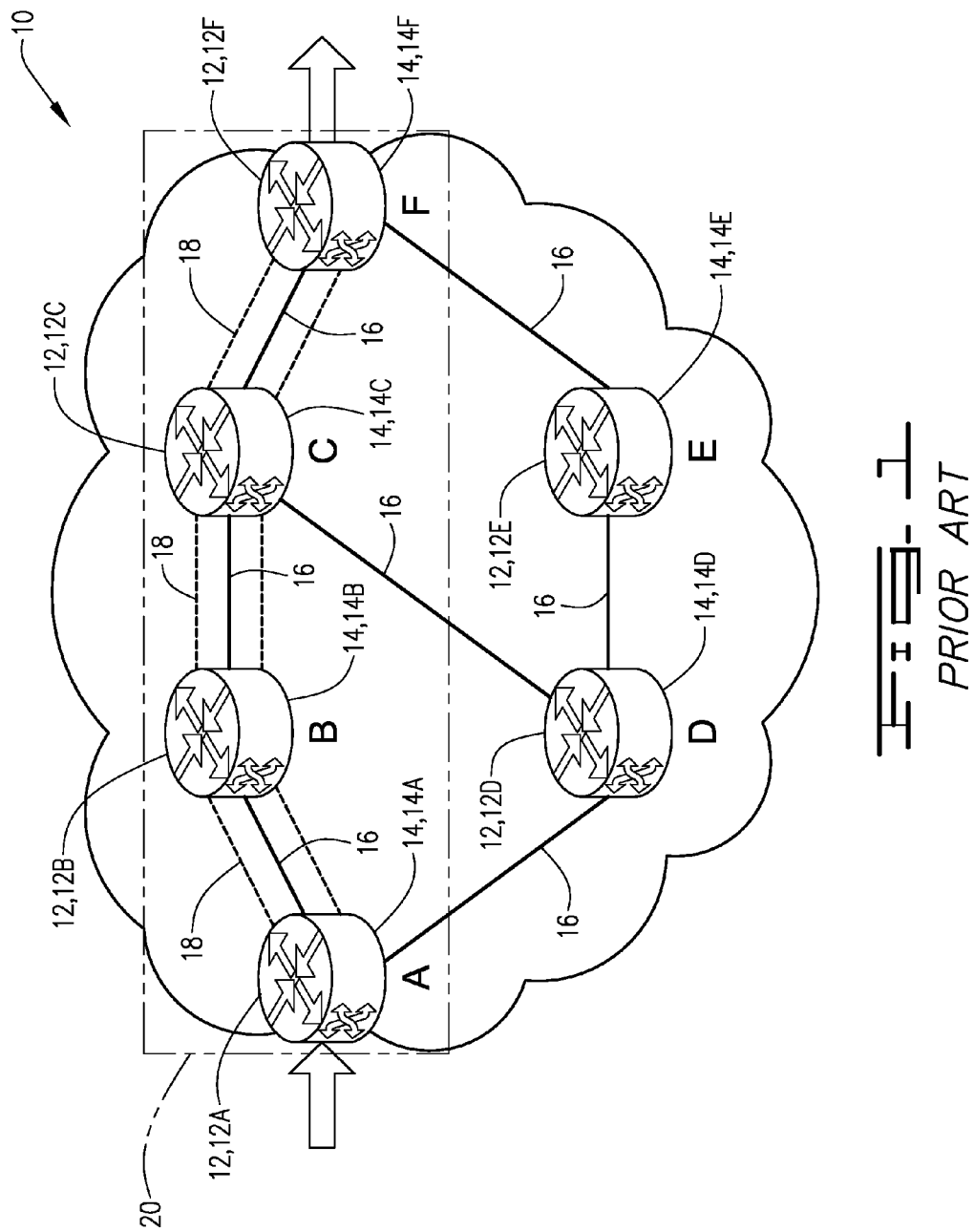
FIG. 1 is a prior art illustration of a multiprotocol label switching (MPLS) network.

The inventive method uses a MPLS network and hyperspeed paths, also known as optimal paths, for command and control, and other high priority traffic. Suboptimal paths, which are slower than optimal paths, are typically used for all non high-priority traffic. This optimal and suboptimal path approach facilitates implementing sophisticated network defense techniques. For example, the time differential between the optimal and suboptimal paths provides a reaction window sufficiently long enough to implement one of many defenses. The communication delay is the amount of time between the origination node, or source node which identifies an attack, and the termination node, or destination node, that receives the warning. The reaction window is the difference in communication delay between the optimal path and a selected suboptimal path. The reaction window also includes the time needed to implement a defense against the identified attack. Data packets sent along hyperspeed paths arrive well in advance of malicious or suspicious traffic to alert network devices and initiate defensive actions. MPLS networks are well suited for this inventive method because MPLS networks logically separate the internal internet protocol (IP) control network from external IP networks that connect with the data plane. The example used herein describes a core MPLS network, but any type of network may adapt and employ the inventive method. The hyperspeed messages are electronic communication signals having at least one data packet. The traffic is the electronic communication carried by the network.

There are one or more optimal paths and a plurality of suboptimal paths between two nodes on the network. This provides for different reaction time windows. The reaction time windows vary, based upon malicious or suspicious traffic, and provide more or less time to implement defensive actions. Depending on its nature and priority, most traffic is sent along suboptimal paths. However, traffic deemed to be malicious or suspicious is sent along the slowest paths. Similarly, the hyperspeed paths are not solely reserved for command and control traffic. Some time-critical traffic, such as interactive voice and video communications, are also sent along faster suboptimal paths and/or hyperspeed paths. Network administrators must balance the speeds of different types of traffic, or risk reducing the reaction time window, thereby decreasing the time available to implement defensive actions.

At least three service differentiation techniques for introducing delays exist. A first service differentiation technique is the queue priority technique, which gives hyperspeed traffic the highest priority. A second service differentiation technique is the delay variation technique, which delays non-hyperspeed traffic for a set period-of-time in queues maintained at the network nodes. A third service differentiation technique is the route variation technique, which forces non-hyperspeed traffic to take slower, suboptimal paths. The third technique requires an algorithm that is discussed in detail hereinbelow. All three service differentiation techniques are useable individually, or in combination, to satisfy specific reaction time windows given the available network resources and constraints. To maximize the overall efficiency of the network, any use of a suboptimal path should incorporate the smallest delay necessary to obtain the desired reaction time window. Suboptimal paths are created by introducing delays in the network.

Inventive Overview—Core Capabilities

One of the core capabilities of the inventive method allows the network administrator to identify a threat, or target packet, and send a hyperspeed signal to any node in the network before a target packet arrives at a node under attack. The network administrator can do this in one of two ways. The first way has a single hyperspeed signal arriving before the target packet. The first way provides the network administrator the ability to track multiple target packets and to correlate information about all target packets, regardless of their locations in the network. The second way uses multiple hyperspeed signals, one for each target packet under observation.

Another core capability is the opportunity to collect intelligence, conduct surveillance of the network, and reconnoiter the network. Often, these actions are referred to as Intelligence, Surveillance, and Reconnaissance (ISR). In this context, Intelligence involves integrating time-sensitive information from all sources into concise, accurate and objective reports related to a threat situation. Reconnaissance refers to acquiring information about a threat, possibly a one-time endeavor. Surveillance refers to the systematic observation of a targeted area or group, usually over an extended time. In the event the network administrator needs ISR capabilities for any reason, the scope and speed of ISR is only limited by the connectivity of the nodes via hyperspeed paths, and the reaction time windows offered by these paths.

A third core capability relates to defensive actions. Hyperspeed signals allow the implementation of sophisticated network defenses. The advance warning provided by hyperspeed signaling enables a network to seemingly employ "precognition," and react to an attack before it reaches the target. The different defenses are discussed in detail hereinbelow.

Hyperspeed signaling enables distributed filtering, teleporting packets, quarantining network devices, tagging and tracking suspicious packets, projecting holographic network topologies, and transfiguring networks. The distributed filtering defense allows network administrators to outsource detection mechanisms to various locations and/or organizations. Teleportation enables packets to be transported by masked or secret routes across a network without being detected. Quarantining enables a network device, segment or path to vanish before it can be affected by an attack. Tagging facilitates the tracking of suspicious traffic and the routing of other traffic accordingly. Network holography conceals a real network and projects an illusory topology. Transfiguration enables network topologies to be dynamically manipulated to adapt to the environment and context of the threat.

Hyperspeed Defense On Service Provider Networks

Referring to FIG. 1, network 10, is illustrated as having nodes 12. Nodes 12 are represented as A-F. In this case network 10 is a service provider network 10. Node 12 A-F representations are associated with routers 14A-14F. Links 16 are the connections between nodes 12. In network 10, as illustrated, node 12A is the ingress node, and node 12F is the egress node. Node 12A is also referred to in FIG. 1 as the source or origination node. Node 12F is also referred to as the termination node or destination node.

Route 18 is the sequence of links 16 that an electronic signal travels between an origination or source node 12A, and the intervening nodes 12B and 12C until it reaches a termination or destination node 12F. FIG. 1 illustrates route 18 as three links 16 between nodes 12 marked as A-B-C-F, which are also routers 14A, 14B, 14C and 14F. Similarly, nodes 12D and 12E are also routers 14D and 14E. Path 20 includes links 16 and queues associated with nodes 12. Path 20 is illustrated in FIG. 1 as three links 16 between and including nodes 12 marked as A-B-C-F, which are also routers 14A, 14B, 14C and 14F. The dashed line on FIG. 1 represents path 20. The path time is the sum of the delay times imposed by the constituent links 16 and queues comprising path 20.

Network 10 illustrated in FIG. 1 is representative of a multiprotocol label switching (MPLS) provider network. MPLS is an ideal technology for implementing hyperspeed signaling because it has built-in identification and service differentiation technologies. Labels in MPLS act like circuit identifiers in asynchronous transfer mode (ATM) to designate paths 20 taken by packets in the core of network 10.

Figure 2:
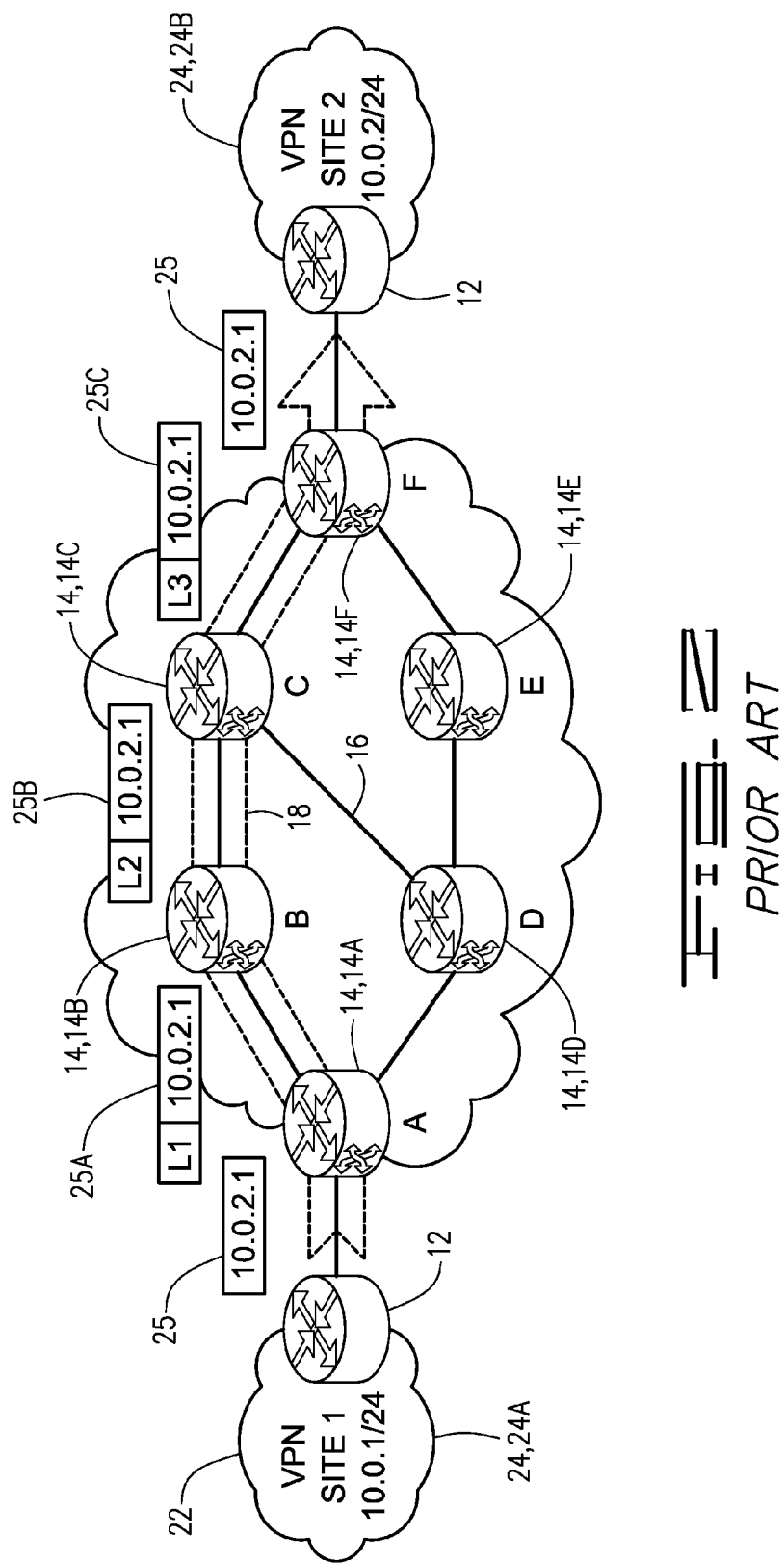
FIG. 2 depicts a prior art schematic of a virtual private network (VPN) consisting of two sites connected via a MPLS VPN service provider.

Virtual private network (VPN) 22, consisting of two sites 24, is connected via network 10 as illustrated in FIG. 2. VPN 22 in FIG. 2 is a prior art illustration as part of a VPN service provider. An unlabeled internet protocol (IP) packet 25 traveling from site 24A to site 24B enters network 10 at router 14A. Router 14A is referred to as label edge router (LER) 14A because it resides at the edge of an MPLS domain. LER 14A examines the destination IP address, consults its IP routing table, applies a Label L1 thereto, and forwards packet 25 to router 14B. Router 14B is referred to as label switching router (LSR) 14B because it resides within the MPLS domain. LSR 14B is positioned to receive labeled IP packet 25 and detects Label L1. Using the Label L1, LSR 14B immediately identifies the path for packet 25, replaces Label L1 with Label L2, and forwards packet 25 to LSR 14C. LSR 14C functions in a manner similar to LSR 14B, applies Label L3, and forwards packet 25 to LER 14F. LER 14F recognizes that packet 25 has reached the destination network, removes the label, and forwards the unlabeled IP packet 25 to site 24B.

Using FIG. 2 as an example, hyperspeed routing in MPLS uses labels to distinguish hyperspeed packets 25 from non-hyperspeed packets 25. MPLS-capable routers 14 are equipped with quality of service (QoS) and traffic shaping features. LSRs 14 are configured to give hyperspeed packets 25 the highest priority based on the packet label. Likewise, LSRs are configured to delay hyperspeed packets 25 for a fixed period-of-time in forwarding queues. A non-limiting example of a delayed period-of-time is about 50 milliseconds. Because the label dictates the QoS and path 20, non-hyperspeed packets 25 can be redirected along circuitous routes 18 by constructing the corresponding paths 20 using non-hyperspeed labels. The labels corresponding to optimal routes 18 are reserved for hyperspeed packets 25.

Hyperspeed Defense on Local Area Networks (LAN)

The same hyperspeed communication process discussed above may be applied to a LAN. Hyperspeed signals are identified by reserving a special set of MAC addresses using fields in 802.1q (VLAN) headers or using 802.1p (Ethernet QoS), depending on the technologies supported by Ethernet switches 26. To implement the hyperspeed communications, most Ethernet switches 26 would require specialized software.

Implemented in a similar manner to hyperspeed communications, queue priority is implemented by programming Ethernet switches 26 to forward hyperspeed frames ahead of all other frames in the memory of Ethernet switches 26. Ethernet switches 26 supporting 802.1p are already equipped for queue priority. Implementing delay variation includes programming Ethernet switches 26 to place non-hyperspeed frames in a queue where the frames wait for a fixed period-of-time.

Figure 3A:
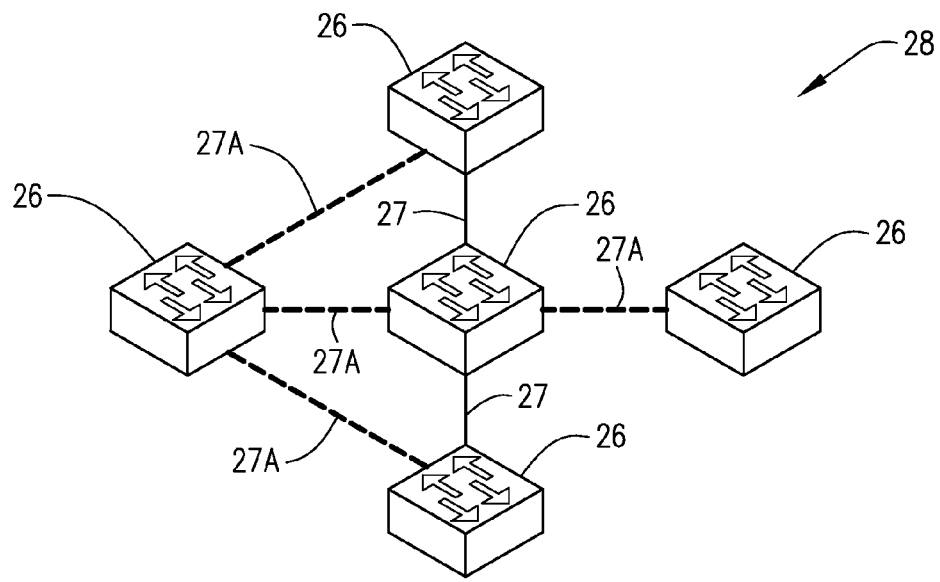
FIG. 3A depicts a schematic of suboptimal routing in a local area network (LAN) spanning tree for users.
Figure 3B:
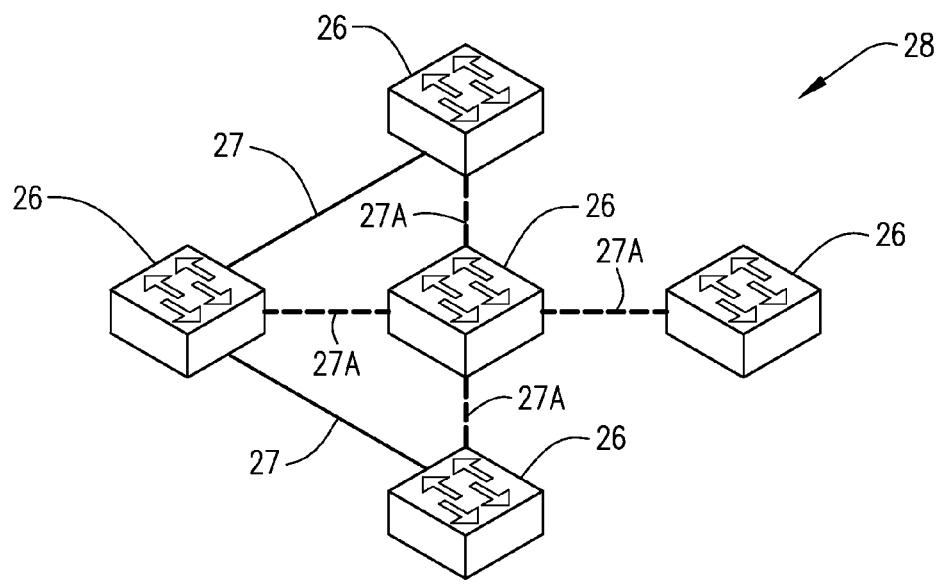
FIG. 3B depicts a schematic of hyperspeed routing in a LAN spanning tree.

Route variation is implemented in several ways. One approach is to modify the Spanning Tree Protocol to calculate two spanning trees. The example in FIGS. 3A and 3B depicts two spanning trees in Ethernet LAN 28. A non-optimal spanning tree used by non-hyperspeed frames is illustrated in FIG. 3A. FIG. 3B illustrates the minimum spanning tree, which is used by hyperspeed frames. Lines 27 depict the Ethernet links. Dashed lines 27A indicate that the link has been selected as part of the spanning tree. The approach for implementing route variation is limited because the reaction time window provided by the maximum spanning tree compared to that provided by the minimum spanning tree may not be sufficient to implement defensive actions. This problem is resolved by also applying the delay variation technique to obtain the desired reaction time window.

Alternatively, implementing route variation involves programming Ethernet switches 26 to store the loop count in an unused Ethernet header field, and to send frames in loops a fixed number of times. Another alternative employs Virtual LAN (VLAN) 28 hopping. This alternative is also applicable to enterprise networks, described hereinbelow.

Hyperspeed Defense on Enterprise Networks

Figure 4:
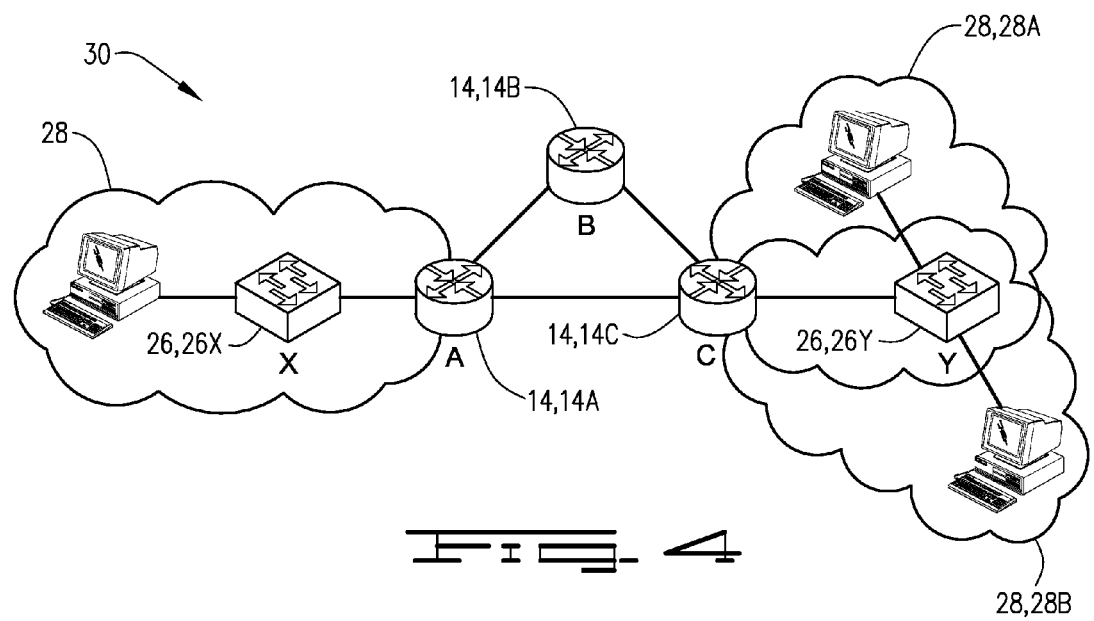
FIG. 4 depicts a schematic of hyperspeed routing in an enterprise network.

Referring to FIG. 4, enterprise network 30 is illustrated. Because enterprise networks 30 are composed of LANs 28 using IP, the techniques for implementing hyperspeed signaling in LANs 28 are also applicable to enterprise networks 30. However, the protocols that support enterprise networks 30, such as IP, are manipulated to enable hyperspeed signaling in enterprise networks 30. Larger enterprise networks 30 may apply the same service differentiation techniques used by service providers. Depending upon the size of enterprise network 30, by way of a non-limiting example, and either singly or in combination, the protocols used include, IP, MPLS, as well as other older and newer protocols.

The type of service (ToS) field or an IP option can be used to distinguish hyperspeed packets 25 from other packets 25. The features of routers 14 of enterprise network 30 determine particular service differentiation techniques available. If routers 14 have the proper features, the queue priority and delay variation techniques are implemented by configuring routers 14 to give priority to hyperspeed packets 25 and to delay non-hyperspeed packets 25 in queues.

Route variation is implemented by manipulating routing protocols (e.g., routing information protocol (RIP) and open shortest path first (OSPF)), or by applying a specialized hyperspeed routing protocol such as $\Delta c$ protocol, which is discussed in detail hereinbelow. FIG. 4 illustrates enterprise network 30 consisting of three LANs 28 connected by three IP routers 14. Two LANS 28A and 28B are both VLANs 28. To implement route variation, the routing table at router 14A must be manipulated, or router 14A must be programmed to send ordinary packets 25 to a next hop that does not correspond to the hyperspeed path. Thus, hyperspeed packets traveling from LAN 28A to VLAN 28B follow the optimal hop sequence identified by X-A-C-Y. Non-hyperspeed packets 25 follow the hop sequence identified by X-A-B-C-Y. Hop sequence X-A-C-Y represents Ethernet switch 26X to router 14A to router 14C to Ethernet switch 26Y. Similarly, hop sequence X-A-B-C-Y represents Ethernet switch 26X to router 14A to router 14B to router 14C to Ethernet switch 26Y.

In the case of enterprise networks 30 employing VLANs 28, Ethernet switches 26 are programmed to permit VLAN 28 hopping. Referring to FIG. 4, hyperspeed packets 25 traveling from VLAN 28B to VLAN 28C hop via Ethernet switch 26Y without visiting router 14C. On the other hand, non-hyperspeed packets 25 travel via the sequence of Y-C-Y, visiting router 14C as expected. The sequence of Y-C-Y represents packet travel from VLAN 28B to Ethernet switch 26Y to router 14C to Ethernet switch 26Y to VLAN 28C.

Enterprise networks 30 may contain VPNs 22. The implementation of hyperspeed signaling in enterprise networks 30 with VPNs 22 that span multiple geographic locations may require the cooperation of one or more service providers.

Hyperspeed Defense on Internet

Internet protocols require modification of the software in routers 14 and Ethernet switches 26. However, an altered protocol can be wrapped between service provider networks, LANs 28 and enterprise networks 30. Other switches used with computer communications, such as ATM switches, fiber optics, etc., are understood to be used in place of, or in combination with Ethernet switches 26. Hyperspeed packets 25 in the Internet are identified using ToS or optional IP fields. Since the Internet is composed of service provider networks 10, hyperspeed signaling implementations for service provider networks 10 are employed. The same is true of LANs 28 and enterprise networks 30. Enterprise networks, LANs, and participating providers perform hyperspeed routing without the cooperation of non-participating providers. Non-participating providers behave in the standard way while participating networks treat the non-participating providers as if they were links among the participating networks.

Figure 5:
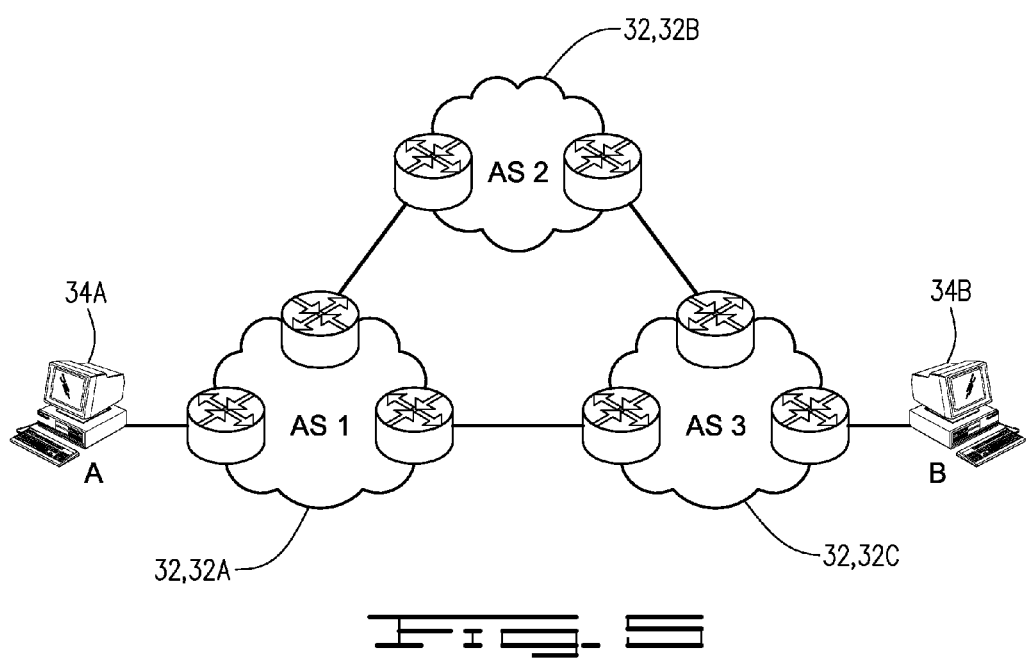
FIG. 5 depicts a schematic of hyperspeed routing in the Internet.

Cooperating service providers can also manipulate the Border Gateway Protocol (BGP) to create optimal and suboptimal paths 20 without advertising the optimal (hyperspeed) paths 20 to non-cooperating service providers. FIG. 5 illustrates three autonomous systems (AS) 32 with Client 34A connected to AS 32A and Client 34B connected to AS 32C. Hyperspeed packets 25 traveling from Client 34A to Client 34B would follow the AS 32 sequence of AS 32A to AS 32C, while non-hyperspeed packets 25 would follow the AS 32 sequence of AS 32A to AS 32B to AS 32C.

Hyperspeed Defense Techniques

As discussed earlier, hyperspeed signaling helps to implement sophisticated network 10 defense techniques. Some of these defense techniques include: distributed filtering, teleporting packets 25, quarantining network devices, tagging and tracking suspicious packets 25, projecting holographic network 10 topologies and transfiguring networks 10. Due to the speeds required to react, all of the defensive techniques are automated. However, as used herein, the network administrator is identified as the actor, meaning that the network administrator sets the parameters used in the defensive technique. In some defensive techniques, the network administrator may also activate the technique (e.g., in teleportation, he may press "enter" when he wants the teleportation sequence to begin), or he may be the recipient of information (e.g., in tagging, he is notified when the target router is believed to be compromised). However, these actions are usually automated processes with defined responses.

Hyperspeed Defense Techniques—Distributed Filtering

Figure 6:
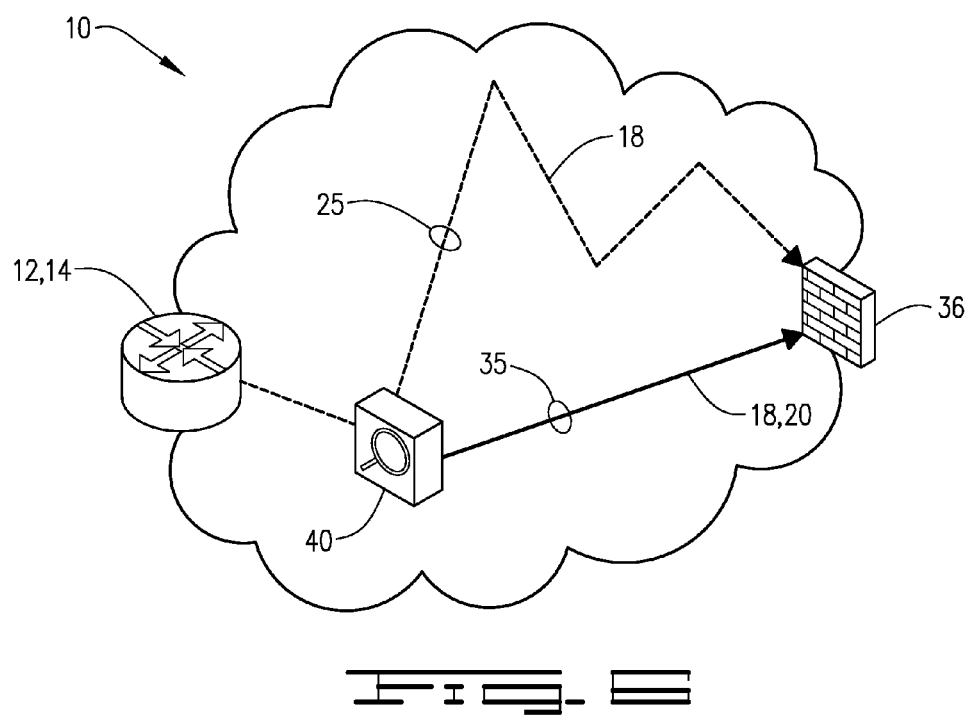
FIG. 6 depicts a schematic of an egress filtering configuration.

Hyperspeed signaling supports a variety of distributed filtering configurations. The simplest configuration is "egress filtering" that can be used by service provider networks 10 and other entities that transport traffic between a plurality of networks 10. As depicted in FIG. 6, when a malicious packet 25 is identified, a hyperspeed sentinel message 35 is sent to egress filter 36 to intercept malicious packet 25. If the reaction time window is sufficiently large, sentinel message 35 arrives at egress filter 36 in advance of malicious packet 25 to permit the threat to be neutralized. Sentinel message 35 must contain sufficient information to identify malicious packet 25. Malicious packet 25 is dropped at egress filter 36, and the downstream network 10 is unaware of the attempted attack.

Hyperspeed sentinel messaging enhances flexibility and efficiency by distributing detection and filtration functionality. In addition, it enables service provider networks 10 and other networks 10 that employ multiple detection modalities to maintain low latency. A non-limiting example of other networks 10 includes enterprise networks 30.

Figure 7A:
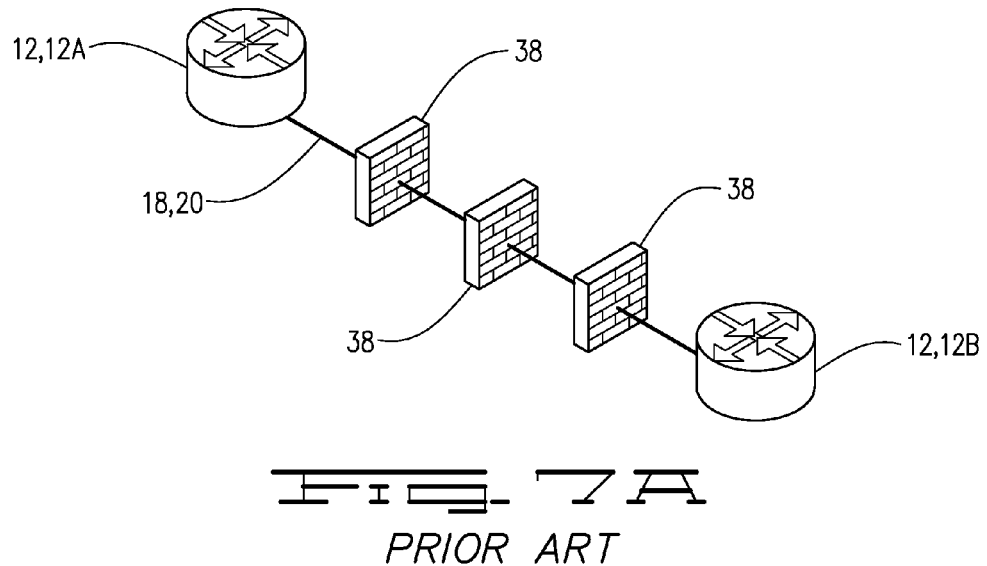
FIG. 7A depicts a prior art schematic of a traditional serial detection filtering configuration.
Figure 7B:
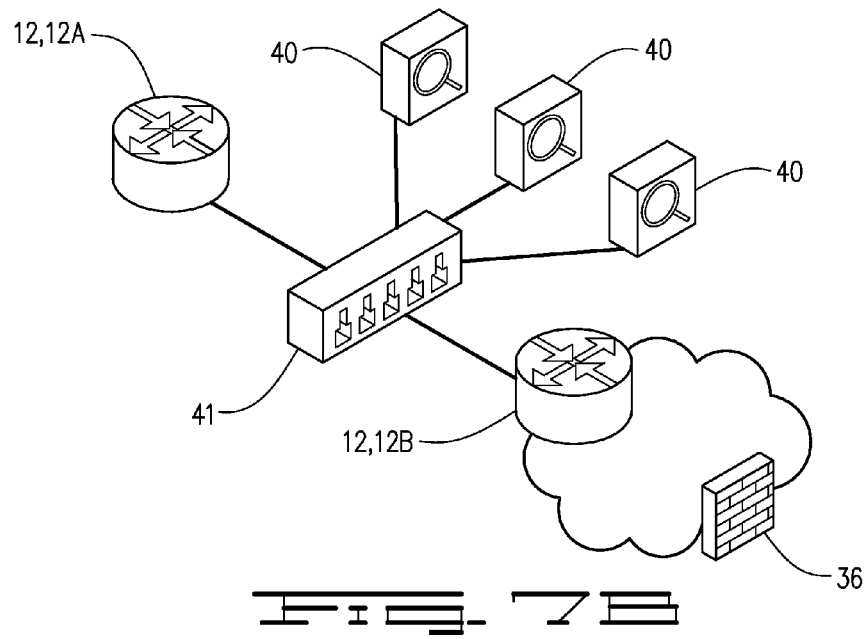
FIG. 7B depicts a schematic of a distributed, parallel filtering configuration.

The traditional ingress filtering approach is illustrated in FIG. 7A. This approach deploys detector-filters 38 in series, where each detector-filter 38 contributes to the overall delay. The traditional approach requires first detector-filter 38 to finish processing a packet 25 before second detector-filter 38 begins processing that packet. A non-limiting example of detector-filter 38 includes a firewall. Ingress node 12A, route 18 and node 12B are also depicted in FIG. 7A. The distributed filtering approach illustrated in FIG. 7B is a parallel approach allowing all of detectors 40 to process the same packet 38 at the same time. The distributed filtering approach deploys detectors 40, which are electronically communicating with hub 41, and positioned to operate concurrently. Thus, the overall delay is the delay introduced by the single slowest detector 40 plus the delay required for egress filtering.

Figure 8:
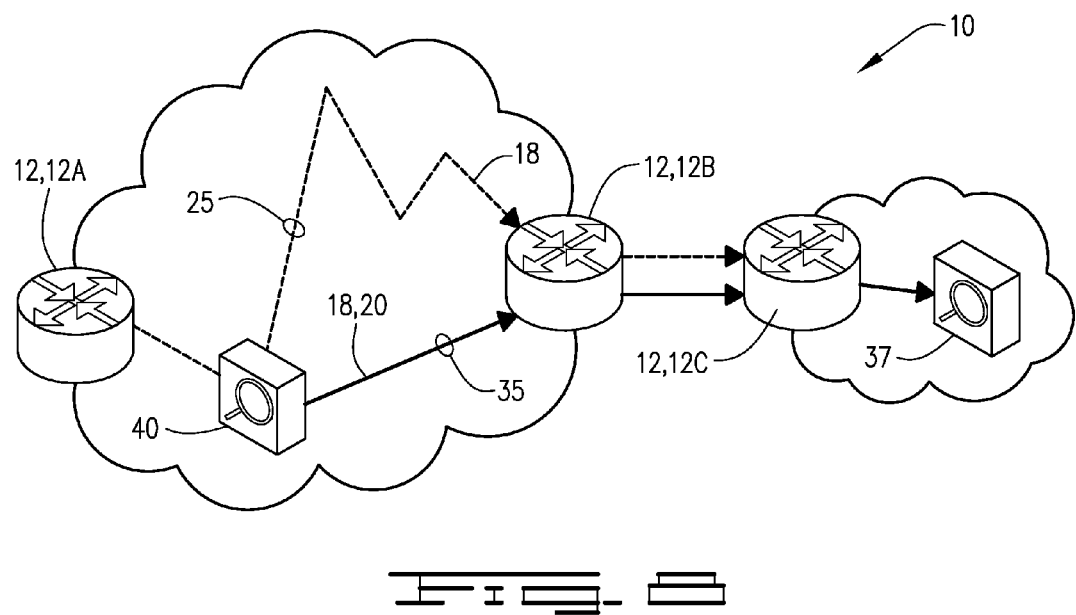
FIG. 8 depicts a schematic of an egress filtering configuration employing an advance warning.

Referring to FIG. 8, an advance-warning configuration is illustrated, whereby a hyperspeed signal, referred to here as sentinel message 35, is sent to the customer ingress node 12B instead of the provider egress node 12A after detector 40 identifies a threat or suspicious traffic. In this configuration, the service provider network 10 detects malicious packets 25, but only alerts the customer network 10 about the incoming packets 25. Since the customer network 10 has advance warning, the customer network 10 is able to use analysis device 37 to observe, analyze and/or block the malicious traffic. The same advance-warning configuration is applicable to peer networks 10.

The advance-warning configuration enables networks 10 to outsource detection. Copies of suspicious packets are forwarded to a third party having sophisticated detection capabilities. For example, security service providers or government agencies may take advantage of the advance-warning configuration. In the case of security service providers, if the third party detects malicious activity, it can send a hyperspeed signal to trigger filtering. The third party is able to correlate packets observed from multiple client networks 10 and provides sophisticated detection services to its clients without compromising any information or data. Governmental agencies are able to use the same technique for national security related reasons.

Hyperspeed Defense Techniques—Teleportation

Figure 9:
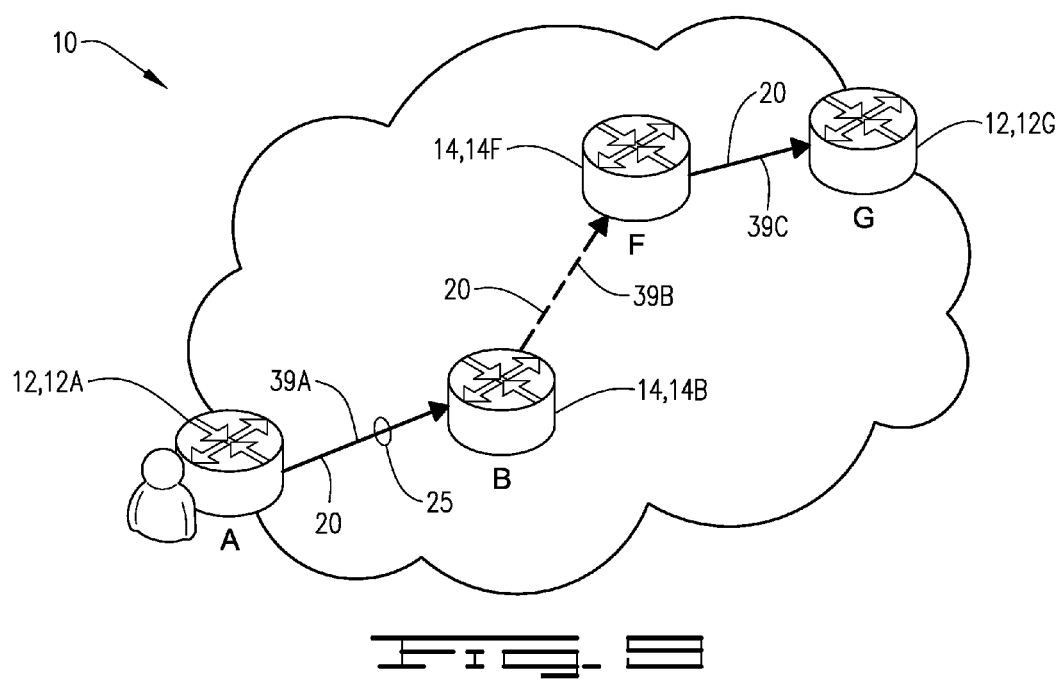
FIG. 9 depicts a schematic of a simplified teleportation configuration.

Hyperspeed routes 18 are used to teleport packets. Simple teleportation is illustrated in FIG. 9. An operator located at Node 12A sends packet 25 along path 20 from node 12A to router 14B to router 14F to node 12G. Hop 39A between node 12A and router 14B is visible. Hop 39B between router 14B to router 14F involves teleportation, where hop 39B does not appear to be visible to the casual observer. Hop 39C between router 14F and node 12G is visible. To teleport packet 25 from router 14B to router 14F, packet 25 could, as a non-limiting example, be encrypted and encapsulated in a labeled internet control message protocol (ICMP) ping packet 25, and sent to router 14B along a hyperspeed path 20, where it would be converted to its original form and forwarded to node 12G along a normal path 20. If the teleportation mechanism is to be further concealed, packet 25 could be fragmented and the fragments sent along different hyperspeed paths 20 to router 14F (assuming that multiple hyperspeed paths 20 exist from router 14B to router 14F). Some non-limiting examples to enhance teleportation include encryption, encapsulation and fragmentation.

Another teleportation approach is analogous to stage magic. Stage magicians often use identical twins to create the illusion of teleportation. To set up the act, the magician positions one twin at the source while the other is hidden at the destination. During the act, the magician directs the first twin to enter a box and then secretly signals the other twin to reveal himself at the destination. The same approach is used to create the illusion of packet 25 teleportation.

Figure 10:
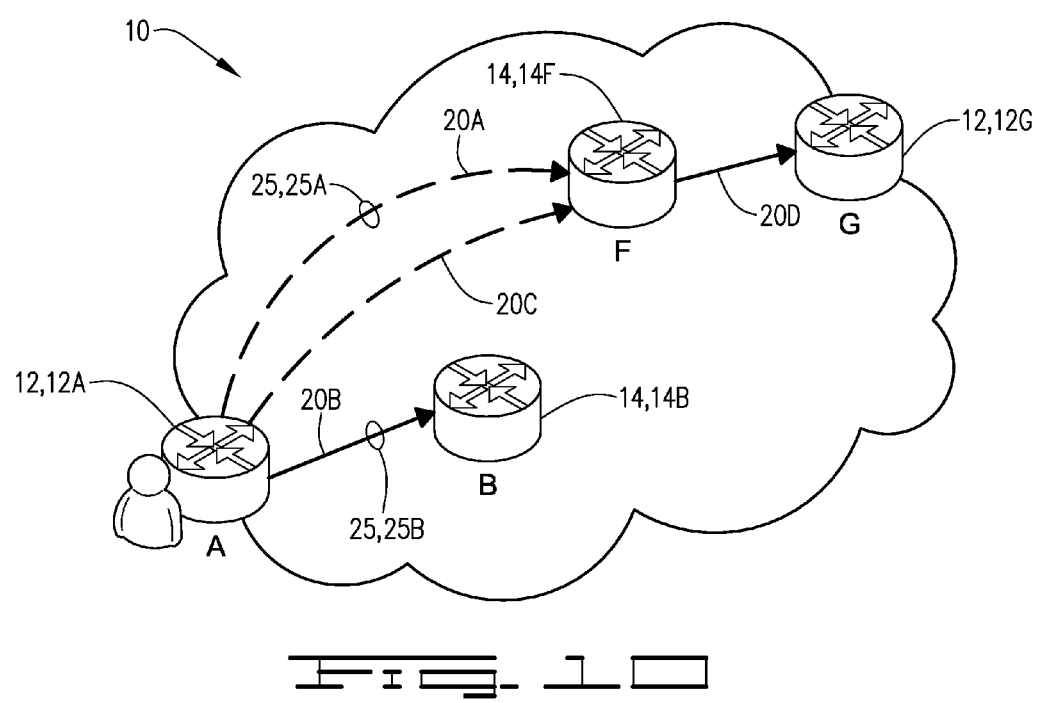
FIG. 10 depicts a schematic of a staged teleportation configuration.

The staged teleportation approach is illustrated in FIG. 10. The operator at node 12A uses simple teleportation to secretly send packet 25A from node 12A to router 14F along path 20A, where packet 25A is staged packet 25A. This is Step 1. The operator then sends an identical packet 25B from node 12A to router 14B along a normal path 20B. Packet 25B is dropped upon reaching router 14B. This is Step 2. The operator next sends a hyperspeed signal from node 12A to router 14F along path 20C. This is Step 3. The hyperspeed signal causes staged packet 25A to move from router 14F to node 12G along a normal path 20D. This is Step 4. A casual observer will see packet 25B travel from node 12A to router 14B, and what he perceives to be packet 25B subsequently travel from router 14F to node 12G. But, the casual observer will not see packet 25B travel from router 14B to router 14F, because no such transmission takes place. Depending on the time-sensitivity of the operation, Step 1 can be put into place well in advance of executing Steps 2, 3 and 4.

An alternative variation of the teleportation approach modifies Step 1. An operator located at router 14F sends a copy of packet 25 to node 12A along a covert hyperspeed path 20A using simple teleportation. Similar to the previous teleportation approach, a casual observer will see packet 25B travel from node 12A to router 14B, and the perceived packet 25B travel from router 14F to node 12G, but not from router 14B to router 14F. This teleportation approach helps conceal the real origins of network messages.

Figure 11:
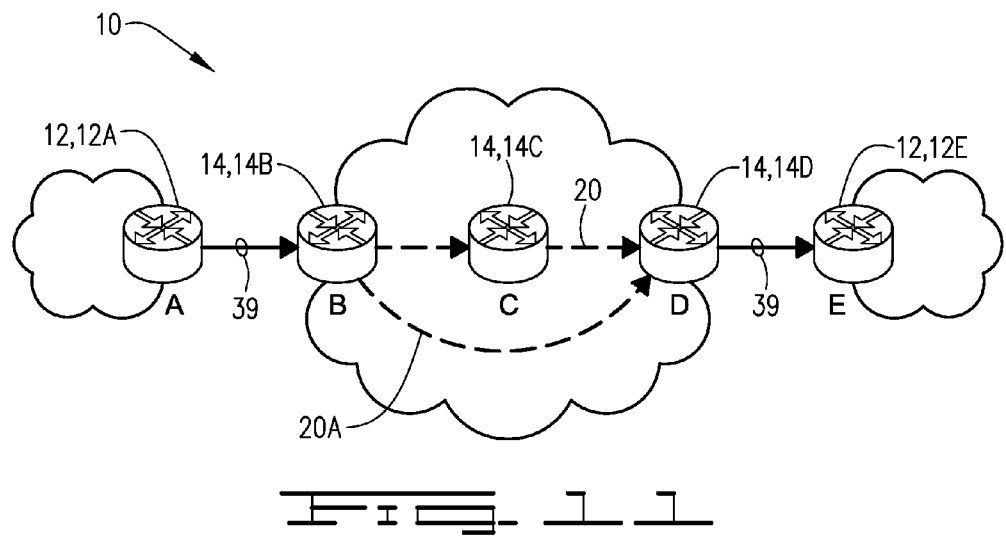
FIG. 11 depicts a schematic of a predictive teleportation configuration.

Another alternative of teleportation involves prediction. FIG. 11 illustrates a customer pinging its remote sites according to a regular schedule. Under normal circumstances, each ping 39 might traverse path 20 comprising node 12A to router 14B to router 14C to router 14D to node 12E, as shown in FIG. 11. However, with teleportation, the transport mechanism from router 14B to router 14C to router 14D would be concealed. To teleport a customer ping 39, routers 14B and 14D must be able to predict the ping schedule. When the customer sends ping 39, router 14B drops the ping, and router 14D produces the ping at the predicted time. However, if router 14B does not receive the expected ping, it notifies router 14D immediately via a hyperspeed path 20A. Router 14D would most likely send an erroneous ping 39, but it will know to discontinue teleportation until network 10 can predict the pinging schedule.

Hyperspeed Defense Techniques—Quarantining

Figure 12:
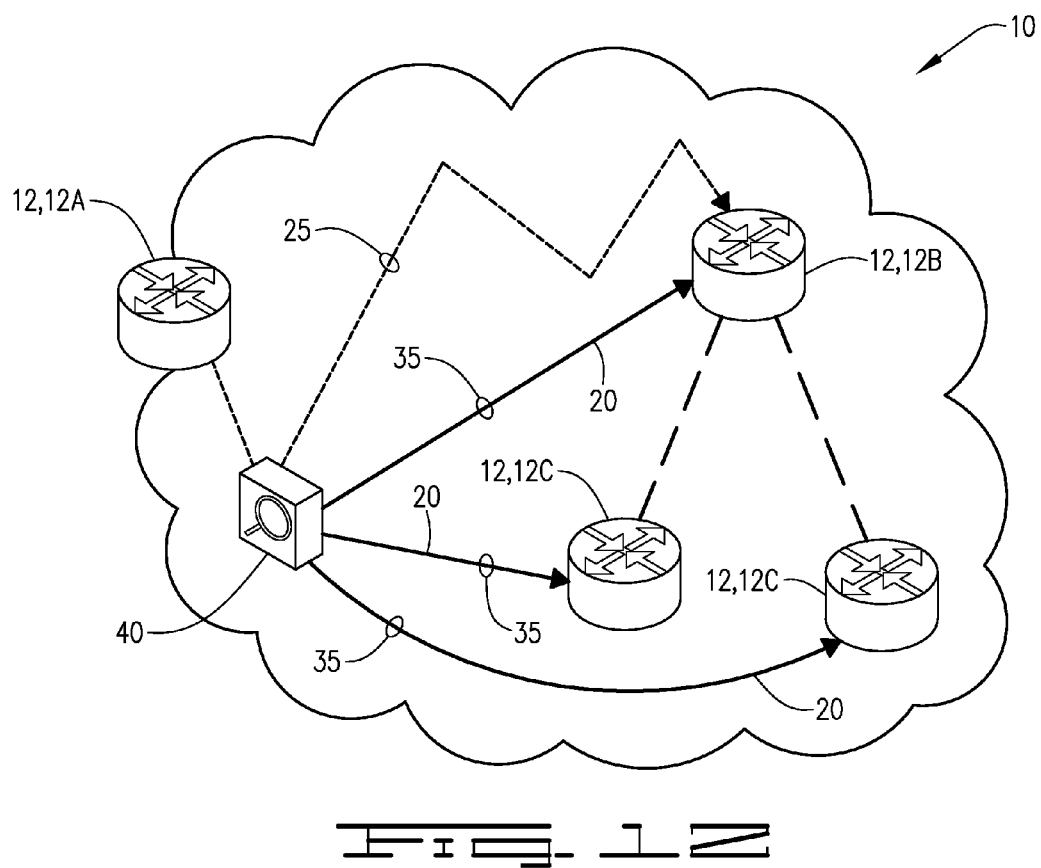
FIG. 12 depicts a schematic of a quarantining network device configuration.

Quarantining enables a targeted network device, segment or path 20 to disappear before it can be compromised by an attack. As illustrated in FIG. 12, node 12A is the ingress node and communicates packet 25 to detector 40. Packet 25 is a malicious packet 25 targeting node 12B. Detector 40 then sends hyperspeed signals 35 to the appropriate network nodes 12C to prevent malicious packet 25 traffic from reaching node 12B, the targeted device. This quarantines the node 12B, the targeted device, from attack.

If the attack reaches the targeted device before it is quarantined, the device is isolated before it can affect other parts of network 10. The device is reconnected only after it is verified to be secure. Because the quarantine messages travel along hyperspeed paths 20, the likelihood that the attack will be thwarted before it impacts the targeted device is increased. The same technique is used to quarantine network segments or deny the use of certain network paths 20.

Hyperspeed Defense Techniques—Tagging

Figure 13:
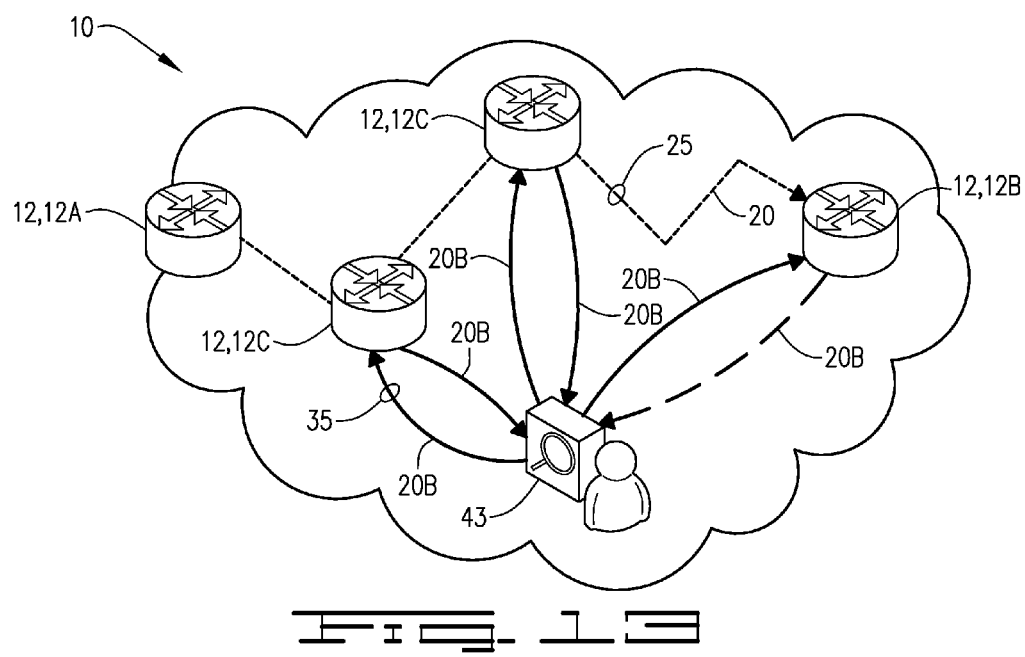
FIG. 13 depicts a schematic of a tagging configuration.

In a tagging defensive technique, a network administrator tracks path 20 taken by suspicious traffic. An analogy from nature is the ant leaving a trail of pheromones to indicate its path. A network administrator's system 43 sends diagnostic packets 25 via hyperspeed paths 20B to nodes 12 along path 20 taken by a suspicious packet to observe its behavior. If, as illustrated in FIG. 13, suspicious packet 25 causes anomalous behavior at one of nodes 12, illustrated as 12B, the diagnostic packet 25 reports the anomaly via a hyperspeed signal 35 and the compromised device may be quarantined as described hereinabove. In extreme cases, all nodes 12 on path 20 taken by the suspicious packet will be quarantined until the situation is resolved. As illustrated, suspicious packet 25 enters network 10 at ingress node 12A and travels through intermediate nodes 12C until it hits target node 12B.

Tagging is used to mitigate the effects of attacks that originate from multiple sources, including distributed denial-of-service attacks (DDoS) and other attacks. One of many examples is an attack that is fragmented into five benign packets 25, and is executed only when all five packets 25 are assembled in sequence. Since a single stateful firewall with knowledge about the fragmented attack can detect and block one or more packets 25, implementing a successful attack would require packets 25 to be sent from different locations.

The tagging mechanism counters the fragmented attack by quarantining the target node 12B as soon as anomalous behavior is detected. Packets 25 that constitute the attack are traced back to their origins at perimeter 42 of network 10. Filters 36 and detectors 40 must be appropriately re-configured to detect the attack.

Hyperspeed Defense Techniques—Network Holography

Networks 10 hide their internal structure by using private IP addresses. The hidden nature of the IP addresses enables hyperspeed signaling on networks 10 by projecting illusory internal structures or "holograms."

Conventional holograms are created using lasers and special optics to record scenes. For example, when a cylindrical piece of glass is used, a scene is recorded from many angles. Once recorded, the original scene can be removed, but the hologram will project the recorded scene according to the viewing angle. If enough angles are recorded, the hologram creates the illusion that the original scene is still in place.

Figure 14:
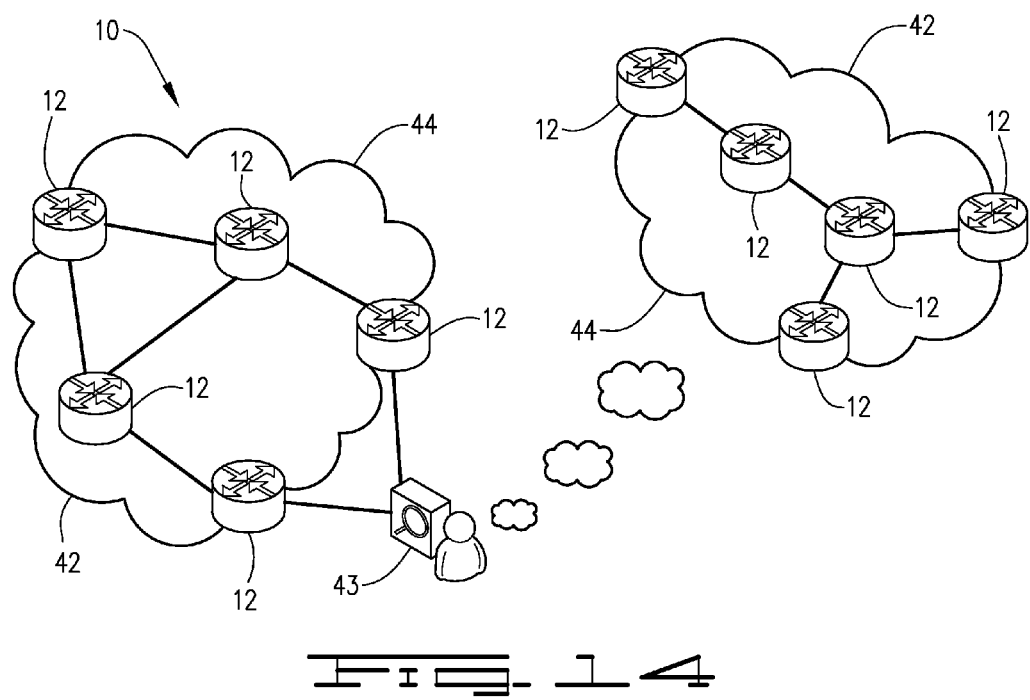
FIG. 14 depicts a schematic of a network holography configuration.

Similarly, the network administrator creates topology 44, which is an illusory topology 44, of network 10 and subsequently distributes the illusory topology 44 to edge nodes 12 of a real network 10, as illustrated in FIG. 14. The presence of multiple hyperspeed paths 20 between pairs of edge nodes 12 helps simulate illusory topology 44. Other nodes 12 may be included, but edge nodes 12 must be included to create the illusion. When probes (e.g., ping and traceroute) hit the real network 10, edge nodes 12 respond to the probes as if network 10 has illusory topology 44. The same topology 44 is simulated from substantially all angles (i.e., no matter where the probe enters network 10) to maintain the illusion.

Hyperspeed Defense Techniques—Transfiguration

Transfiguration enables networks 10 to cooperate, much like utilities in the electric power grid, to continue providing services during times of crisis. Network administrators manipulate their internal network 10 topologies, or modify the topologies 44 along perimeter 42 of cooperating networks 10, to lend or lease additional resources as required. Additionally, administrators may modify topologies 44 at perimeter 42 near an attack. This method is analogous to moving the frontline forward or backward during a battle.

Links 16 and nodes 12 may need to be strategically quarantined, disabled or re-enabled based on circumstances. As resources are lost and gained, the roles of devices, especially at perimeter 42, may change. Hyperspeed signaling enables topology 44 changes to occur seemingly instantaneously, and enables devices with special roles to operate in proxy where necessary at perimeter 42. As resources become available, the window for hyperspeed signaling is adjusted as necessary to provide additional reaction time. The resource availability is a result of being regained after being compromised or being leased from other sources.

Hyperspeed Defense Techniques—Implementation

Implementing hyperspeed signaling in network 10 requires a protocol that applies the queue priority, delay variation and route variation service differentiation techniques appropriately to achieve the target reaction time window. The target reaction window is the desired reaction window where the electronically communicated high-priority signal arrives faster than all lower-priority signals transmitted within the time period. Of these techniques, implementing the route variation technique is relatively complicated. If a network administrator attempts to build explicitly routed paths 20 to satisfy the target reaction time window, the risk of error is high. In addition, if a link 16 or node 12 becomes unavailable, hyperspeed signaling along the affected paths 20 fails, unless new paths 20 are identified.

An automated protocol for constructing paths 20 that satisfy the target reaction time window in a dynamic network environment is desirable. An approach is to run Dijkstra's Algorithm repeatedly to discover multiple paths 20, but the fastest and slowest loop-free paths 20 still may not accommodate the target window. Dijkstra's Algorithm finds the optimal route 18 from s to d by iteratively and greedily removing edges and nodes 12 from a set of unvisited elements until all nodes 12 are visited. A second approach is to modify routing information protocol (RIP) to track the best route 18 as well as the second-best route 18. This approach can be further extended to track as many routes 18 as are necessary, but the number of routes 18 is difficult to determine based on the target window. The first two approaches can be applied in combination with the queue priority and delay variation techniques, but a protocol that works directly with the target window would be the most desirable. That protocol is referred to herein as the $\Delta c$ Algorithm, and is illustrated by Equation 1 below.

$\Delta c$ Algorithm Protocol

The $\Delta c$ Algorithm gives the service providers the ability to specify a desired decision window. Thus, it provides a flexible means for delivering control traffic faster than data traffic while maintaining near-optimal speeds on network 10.

The $\Delta c$ Algorithm for a computer or telecommunications network 10 must be able to see the entire network 10 to allow the $\Delta c$ Algorithm to properly execute using the complete topology thereof. There are at least two approaches for implementing the $\Delta c$ Algorithm. One approach is developing a protocol like open shortest path first (OSPF), where information about topology 44 of network 10 is flooded to nodes 12, thereby giving each node 12 a complete picture of network 10, and facilitating independent execution of the $\Delta c$ Algorithm. Another approach uses a protocol similar to RIP, where each node 12 in a distributed fashion depends on the routes 18 computed by its neighboring nodes 12 in order to compute new routes 18.

Discussed below is the approach using a protocol similar to RIP articulating the $\Delta c$ Algorithm as a distributed routing protocol, or Distributed $\Delta c$ Protocol, for computer and telecommunications networks 10. Also discussed below is the $\Delta c$ Label Distribution Protocol ($\Delta c$-LDP), which is an adaptation of the Distributed $\Delta c$ Protocol targeted for MPLS networks 10. $\Delta c$-LDP constructs hyperspeed label switched paths (LSPs) in an MPLS network, facilitating the implementation of the above discussed reactive defense mechanisms such as quarantining compromised network devices before infections spread, teleporting packets 25 via concealed transport mechanisms, and projecting illusory internal topologies 44.

The mathematical theory for expressing and manipulating route 18 restrictions and applicable proofs clarifying the types of restrictions compatible with $\Delta c$-LDP are presented below. Simulation results of $\Delta c$-LDP are also provided. The independent variables (target $\Delta c$, variance in link delays, number of links 16, number of nodes 12 and application of route 18 restrictions) are varied while the dependent variables (routing table size, actual $\Delta c$ and convergence time) are monitored in randomly-generated networks 10. The simulation results show that the protocol operates well for practical values of $\Delta c$, with respect to average link cost (delay).

The $\Delta c$ Algorithm discovers ranked optimal and suboptimal routes 18 in directed graphs (digraphs) based on a reaction window $\Delta c$. The $\Delta c$ Algorithm offers MPLS service providers an effective means for delivering control traffic faster than data traffic, while maintaining near-optimal speeds on network 10. The definitions and theorems underlying the algorithm are presented herein. For details about graph theory, refer to: G. Chartrand and L. Lesniak, *Graphs and Digraphs*, Wadsworth and Brooks/Cole, Monterey, Calif., 1986. The following definitions identify the symbolic notation, and provide modified definitions to common definitions within the art.

$\Delta c$ Algorithm Protocol—Definitions and Theorems

Definition 1. The length of a route is the number of constituent edges in a route.

Definition 2. The cost of a route is the sum of the costs of the constituent edges in a route.

Definition 3. If $p=\langle s, e_i, \ldots, e_j, t\rangle$ is a route from s to t, and $q=\langle t, e_k, \ldots, e_l, d\rangle$ is a route from t to d, then the concatenation $p \cdot q = \langle s, e_i, \ldots, e_j, t, e_k, \ldots, e_l, d\rangle$ is route from s to d that is formed by following routes p and q in order.

Definition 4. $R_{s \to d}$ denotes the set of all routes from $s \in N$ to $d \in N$ in a network digraph $\Gamma=(N, E)$. Note that $S \subseteq R_{s \to d}$ is read "S contains a set of routes that share a common source s and destination d."

Definition 5. If there exist three routes p, q, $r \in S \subseteq R_{s \to d}$ such that cost (q)−cost (r)≥$\Delta c$ for some $\Delta c \in \mathbb{R}^+$ and cost (p)>cost (q), then p is a useless route in S with respect to reaction window $\Delta c$. Any other route in S is useful with respect to $\Delta c$. If the set S is not given explicitly, it is implied that S is the set of routes in $\Gamma$ that share the same source and destination as route p.

Definition 6. If $S \subseteq R_{s \to d}$ then $\nabla_{\Delta c} S = \{r \in S | r$ is useful in S with respect to $\Delta c\}$.

The subscript "$\Delta c$" is often omitted hereinbelow for clarity. Thus, statement $r \in \nabla S$ can be read as "r is useful in S." $\nabla S \subseteq S$ follows directly from the definition of $\nabla$.

Theorem 1. Given a network digraph $\Gamma=(N, E)$, if $p \cdot \langle t \rangle \cdot q$ is the $n^{th}$-optimal route from $s \in N$ to $d \in N$ through some intermediate $t \in N$, then both p and q must have a rank of n or better among optimal routes from s to t and t to d, respectively.

Proof. Let $r = p \cdot \langle t \rangle \cdot q$ be the $n^{th}$-ranked optimal route from s to d. Let $p = p_m$ be the $m^{th}$-ranked optimal route from s to t. Then, there exist routes $p_1, p_2, \ldots, p_{m-1}$ with costs $c_1, c_2, \ldots, c_{m-1}$, each of which is less than cost (p). Also, there exist routes $p_1 \cdot q, p_2 \cdot q, \ldots, p_{m-1} \cdot q$ from s to d with costs $c_1 + \text{cost}(q), c_2 + \text{cost}(q), \ldots, c_{m-1} + \text{cost}(q)$ each of which is less than cost (p·q). Thus, there are at least m−1 routes that are more optimal than r, and thus, the rank of r, n, is at least m: n≥m. In other words, p must have a rank of n or better. The result for the rank of q is proved in a similar manner.

Lemma 1. Given a network digraph $\Gamma=(N, E)$, if there exists an $n^{th}$-optimal route of length l>1, then there also exists an $n^{th}$-optimal or better route of length l−1.

Proof. Assume that a route $r=\langle s, e_1, t, e_2, \ldots, e_{l-1}, u, e_l, d\rangle$ of length l>1, and rank n exists for some arbitrary source and destination. The following two routes must also exist: $\langle t, e_2, \ldots, e_l, d\rangle$ of length l−1 that is formed by removing the first node and edge; and $\langle s, e_1, \ldots, E_{l-1}, u\rangle$ of length l−1 that is formed by removing the last node and edge. By Theorem 1, both these routes have rank n or better.

Theorem 2. Given a network digraph $\Gamma=(N, E)$, if there exists an $n^{th}$-optimal route of length l≥1, then there also exist $n^{th}$-optimal or better routes of length m for every 0≤m<1.

Proof. Theorem 2 is proved by the repeated application of Lemma 1.

Theorem 3. Given a network digraph $\Gamma=(N, E)$ and some $\Delta c \in \mathbb{R}^+$, if q is a useless route, then both p·q and q·p are useless routes for any route p.

Proof. Let q be a route from some $t \in N$ to some $d \in N$, and let p be a route from some $s \in N$ to t. Because q is useless, there exist two routes $q_1$ and $q_2$ from t to d such that cost $(q_2)$−cost $(q_1) \geq \Delta c$ and cost $(q) >$ cost $(q_2)$. Let r=p·q; $r_1$=p·$q_1$; and $r_2$=p·$q_2$. Then, r, $r_1$ and $r_2$ are all routes from s to d with costs: cost (r)=cost (p)+cost (q); cost $(r_1)$=cost (p)+cost $(q_1)$; and cost $(r_2)$=cost (p)+cost $(q_2)$. Then, cost $(r_2)$−cost $(r_1)$= [cost (p)+cost $(q_2)$]−[cost (p)+cost $(q_1)$]=cost $(q_2)$−cost $(q_1) \geq \Delta c$, and cost $(q) >$ cost $(q_2) \Rightarrow$ cost (p)+cost $(q) >$ cost (p)+cost $(q_2) \Rightarrow$ cost $(r) >$ cost $(r_2)$. Thus, route r is useless. The result for q·p is proved in a similar manner.

Theorem 4. If p is a useful route in a set $S \subseteq R_{s \to d}$, then p is a useful route in any set $T \subseteq S$ for which $p \in T$. Symbolically, $p \in \nabla S \subseteq R_{s \to d} \Rightarrow p \in \nabla T$ for all $T \subseteq S | p \in T$.

Proof. Because p is useful, there are three possible cases:

Case 1. Three routes do not exist in S. Thus, for any $T \subseteq S$, |T|<3; consequently, p is useful in T.

Case 2. No two routes q, $r \in S$ satisfy cost (q)−cost $(r) \geq \Delta c$. If two such routes do not exist in S, then two such routes cannot exist in a $T \subseteq S$; consequently, p is useful in T.

Case 3. Two routes q, $r \in S$ exist such that cost (q)−cost $(r) \geq \Delta c$, but for any q and r it is the case that cost $(p) \leq$ cost (q). Consider some $T \subseteq S$. Any q and r in T are also in S. For any q and r in S, it must be the case that cost (q)−cost $(r) \geq \Delta c$ and cost $(p) \leq$ cost (q); consequently, cost (q)−cost $(r) \geq \Delta c$ and cost $(p) \leq$ cost (q) for q and r in T. Thus, p is useful in T.

Δc Algorithm

Equation 1 below, is the Δc Algorithm for targeting a specified reaction window. X is a two-dimensional matrix where entry $X_{s,d} \subseteq R_{s \to d}$.

Step

[EQUATION 1]

a. Initialize all entries in X to ∅
b. for all s ∈ N do $X_{s,s} \leftarrow \{\langle s \rangle\}$
c. repeat
d.   for all s ∈ N, d ∈ N do
e.     $S \leftarrow \cup_{e \in E_{\Gamma}^+(s)} \cup_{r \in X_{head(e),d}} \{\langle s, e, head(e) \rangle \cdot r\}$
f.     $X_{s,d} \leftarrow \nabla(S \cup X_{s,d})$
g.   end for
h. until X remains unchanged after a complete iteration.

Equation 1, the Δc Algorithm, is limited by its centralized nature. Although it is modeled after distance-vector algorithms, the Δc Algorithm, as written, must be executed with full knowledge of the network topology. Consequently, the Δc Algorithm must be executed centrally, or like OSPF, the complete network topology must be "flooded" to all nodes, which subsequently execute the Δc Algorithm independently.

In the following, $X^m$ denotes the contents of X after the $m^{th}$ iteration of the repeat block starting at Line 3 in the Δc Algorithm.

Lemma 2. Given a connected network digraph $\Gamma=(N, E)$ and a reaction window $\Delta c \in \mathbb{R}^+$, after m iterations of the Δc Algorithm, $X_{s,d}^m$ is the set of all useful routes of length at most m from $s \in N$ to $d \in N$.

Proof. The proof is established using induction. Consider the base case of m=0 iterations. The only non-empty sets in $X^0$ are those from Step 2 that contain exactly one element: the path from each node to itself. Thus, after one iteration, every path in any set in $X^0$ is useful. Additionally, since the only zero-length routes are the routes from a node to itself, every useful route of length 0 is an element of some set in $X^0$.

For the inductive step, assume Lemma 2 holds after m iterations and consider Iteration m+1. By the inductive hypothesis, any entry $X_{s,d}^m$ is the set of all useful routes from s to d of length at most m. Any route in S (Step 5), the set of candidate new routes, has a length of at most m+1. Thus, any route in $S \cup X_{s,d}^m$ has a length of at most m+1.

Any route in S is computed as $\langle s, e \rangle$ followed by a known route from head (e) to the destination d. Thus, the route is valid and has some cost. The operator $\nabla_{\Delta c}$ selects all useful paths from s to d from the new and old routes, which are then assigned to $X_{s,d}^{m+1}$. The function drops all useless paths of length at most m+1. By Theorem 4, the application of $\nabla_{\Delta c}$ does not drop any useful route, and by Theorem 3, the function does not drop any route that is part of a longer useful route. Thus, $X_{s,d}^{m+1}$ is the set of all useful routes from s to d of length at most m+1.

Theorem 5. The Δc Algorithm terminates when every $X_{s,d}$ is the set of all useful routes from $s \in N$ to $d \in N$.

Proof. It is trivial to see that if the network has only one node, the algorithm will terminate. A connected digraph with at least two nodes must contain a cycle; thus, there are infinitely many routes from a source to a destination. Because N is a finite set, N×N is finite. For each $(s, d) \in N \times N$, consider the optimal route r from s to d. Because there are a finite number of edges, one edge has the minimum (positive) cost; thus, there are a finite number of routes with cost less than cost (r)+Δc. Consequently, there are a finite number of useful routes for a given source and destination.

Let R be the set of all useful routes in the network. Then R is finite. Let l be the length of the longest route in R, and consider Iteration l. By Lemma 2, $X_{s,d}^l$ is the set of useful routes from s to d of length at most l. Since l is the length of the longest useful route, l iterations are sufficient to ensure that $X_{s,d}$ is the set of useful routes from s to d regardless of route length.

Consider Iteration l+1. Any route in S has a length of at most l+1. Pick a route q in S with length l+1, source s and destination d. If q exists, it is not an element of $X_{s,d}^l$. Because $X_{s,d}^l$ contains all useful routes, q must be a useless route and, therefore, is not selected by $\nabla_{\Delta c}$. Any other route in S is already an element of $X_{s,d}^l$. Thus, $\forall s, d \in N$: $X_{s,d}^{l+1}=\nabla_{\Delta c}(S \cup X_{s,d}^l)=X_{s,d}^l$, and $X^{l+1}=X^l$, which causes the Δc Algorithm to terminate.

The Δc Algorithm does not terminate early. Consider the longest useful route and remove its first edge. By the contraposition of Theorem 3, the resulting route must be useful. The resulting route has length l−1; thus, $X^{l-1} \neq X^l$, which prevents the algorithm from terminating at Iteration l. This result can be applied inductively over every previous iteration until the route length is reduced to zero.

Distributed Δc Protocol

The centralized Δc Algorithm, can be transformed into Equation 2, the Distributed Δc Protocol. The Δc Algorithm is modeled after distance-vector routing algorithms, such as RIP. Thus, the Distributed Δc Protocol distributes the workload similarly.

As shown in the Distributed Δc Protocol, each node is responsible for learning all routes for which it is the source. This learning step allows a neighboring node to share fragments of routes that may be used in Step 5 of the Δc Algorithm to compute S. Thus, any node s is responsible for the memory needed to store $X_s$ when executing the Δc Algorithm.

For the sake of simplicity, assume that the network is static and predictable; and all the links are duplex, have a fixed cost and never fail. Implementing the $\Delta c$ Algorithm in a distributed manner requires each node s begins by initializing the set of routes to itself with $\langle s \rangle$. Each node next sends its known routes to each of its upstream neighbors. Each node next uses the routes received from its downstream neighbors, calculates S and applies $\nabla$ (Steps 5 and 6 of the $\Delta c$ Algorithm) for all $d \in N$; the results are stored in $X_s$. After every node has completed its calculations, each node once again sends its known routes. Eventually, the routing tables ($X_s$) converge, and the nodes can terminate the algorithm.

Synchronizing the process (i.e., ensuring that every node is at the same iteration) and knowing when to terminate requires additional communication among the routers. Fortunately, neither synchronization nor termination is necessary to compute the same routes as the $\Delta c$ Algorithm, in a distributed environment. Thus, the Distributed $\Delta c$ Protocol simply allows each node to emit its table periodically and indefinitely; hence, the reference to a Distributed $\Delta c$ Protocol, and not a reference to the $\Delta c$ Algorithm. The routing tables eventually converge to produce all the useful routes given some $\Delta c$.

Equation 2, the Distributed $\Delta c$ Protocol, is formally described in terms of two routines that execute concurrently at each node s, where t is the update period.

Propagation Routine:
Step

[EQUATION 2]

a. Initialize all entries in $X_s$ to $\emptyset$
b. $X_{s,\,s} \leftarrow \{\langle s \rangle\}$
c. loop
d.     for all $e \in E_\Gamma^-(s)$ do
e.         send (e, $X_s$)
f.     end for
g.     wait t
h. end loop Update Routine:
Step 1. loop
2.   recv (e, $X_u$)
3.   for all $X_{u,\,d} \in X_u$ do
4.     $S \leftarrow \bigcup_{r \in X_{u,\,d}} \{\langle s, e, u \rangle \cdot r\}$
5.     $X_{s,\,d} \leftarrow \nabla(S \cup X_{s,\,d})$
6.   end for
7. end loop The send (e, $X_s$) statement transmits the object $X_s$ along link e. The recv (e, $X_u$) statement receives an object in $X_u$ and sets e to the link from which $X_u$ was received. For information to be exchanged, the nodes executing these statements must be on opposite ends of link e.

The fundamental properties of $\nabla$ show that the result of the Distributed $\Delta c$ Protocol is the same as that of the $\Delta c$ Algorithm.

Supporting Theorems and Proofs

Theorem 6. Given $\Gamma=(N, E)$ and some $\Delta c \in \mathbb{R}^+$, for any $R \subseteq R_{s \to d}$, if $S \cup T = R$, then $\nabla R = \nabla(S \cup \nabla T)$.

Proof. $S \cup T = R$ implies $S \subseteq R$ and $T \subseteq R$. Also, if $r \in R$, then $r \notin S \Rightarrow r \in T$ and $r \notin T \Rightarrow r \in S$. Letting $r \in \nabla R$, then by definition, $r \in R$.

Case 1. $r \in S$. Thus, $r \in S \cup \nabla T$
Case 2. $r \in T$. By Theorem 4, $r \in \nabla T$. Thus, $r \in S \cup \nabla T$
By definition, $\nabla T \subseteq T$, so $S \cup \nabla T \subseteq S \cup T = R$. By Theorem 4, $r \in \nabla(S \cup \nabla T)$. Thus, $\nabla R \subseteq \nabla(S \cup \nabla T)$.

Let $r \notin \nabla R$.
Case 1. $r \notin R$. $\nabla(S \cup \nabla T) \subseteq R$, so $r \notin \nabla(S \cup \nabla T)$.
Case 2. $r \in R$. Thus, r is useless in R. By definition, there exist p, $q \in R$ such that cost (p)−cost (q)≥$\Delta c$ and cost (r)>cost (p). Let p and q be the least-cost such routes in R. Consequently p, $q \in \nabla R$.
Case a. $p \in S$. Thus, $p \in S \cup \nabla T$
Case b. $p \in T$. By Theorem 4, $p \in \nabla T$. Thus, $p \in S \cup \nabla T$.
Cases a and b also apply to q, so p, $q \in S \cup \nabla T$. Therefore, r is useless in $S \cup \nabla T$, so $r \notin \nabla(S \cup \nabla T)$.

The contraposition of the result in Cases 1 and 2 is $r \in \nabla(S \cup \nabla T) \Rightarrow r \in \nabla R$. Therefore, $\nabla(S \cup \nabla T) \subseteq \nabla R$.

Theorem 7. Given $\Gamma=(N, E)$ and some $\Delta c \in \mathbb{R}^+$, for any $R \subseteq R_{s \to d}$, if $S \cup T = R$, then $\nabla R = \nabla/(\nabla S \cup \nabla T)$.

Proof. $S \cup T = R$ implies $S \subseteq R$ and $T \subseteq R$. Also, if $r \in R$, then $r \notin S \Rightarrow r \in T$ and $r \notin T \Rightarrow r \in S$. Letting $r \in \nabla R$, then by definition $r \in R$.

Case 1. $r \in S$. By Theorem 4, $r \in \nabla S$. Thus, $r \in \nabla S \cup \nabla T$.
Case 2. $r \in T$. By Theorem 4, $r \in \nabla T$. Thus, $r \in \cap \nabla S \cup \nabla T$.
By definition, $\nabla S \subseteq S$, and $\nabla T \subseteq T$. Thus, $\nabla S \cup \nabla T \subseteq S \cup T = R$. Then, by Theorem 4, $r \in \nabla(\nabla S \cup \nabla T)$. Consequently, $\nabla R \subseteq \nabla(\nabla S \cup \nabla T)$.

Let $r \notin \nabla R$.
Case 1. $r \notin R$. $\nabla(\nabla S \cup \nabla T) \subseteq R$, so $r \notin \nabla(\nabla S \cup \nabla T)$.
Case 2. $r \in R$. Thus, r is useless in R. By definition, there exist p, $q \in R$ such that cost (p)−cost (q)≥$\Delta c$ and cost (r)>cost (p). Let p and q be the least-cost such routes in R. Consequently, p, $q \in \nabla R$.
Case a. $p \in S$. By Theorem 4, $p \in \nabla S$. Thus, $p \in \nabla S \cup \nabla T$.
Case b. $p \in T$. By Theorem 4, $p \in \nabla T$. Thus, $p \in \nabla S \cup \nabla T$.
Cases a and b also apply to q, sop, $q \in \nabla S \cup \nabla T$. Therefore, r is useless in $\nabla S \cup \nabla T$, so $r \notin \nabla(\nabla S \cup \nabla T)$.

The contraposition of the result in Cases 1 and 2 is $r \in \nabla(\nabla S \cup \nabla T) \Rightarrow r \in \nabla R$. Therefore, $\nabla(\nabla S \cup \nabla T) \subseteq \nabla R$.

An important corollary, designated as the first property of $\nabla$ arises from Theorems 6 and 7.

Property 1. If $S \cup T = R$, then $\nabla R = \nabla(S \cup T) = \nabla(\nabla S \cup \nabla T) = \nabla(S \cup \nabla T) = \nabla(\nabla S \cup \nabla T)$.

A second property follows by letting $S = \emptyset$ and $T = R$ in Theorem 6.

Property 2. $\nabla \nabla R = \nabla R$.

A third property follows from applying Property 1 inductively.

Property 3. Given $\Gamma=(N, E)$ and some $\Delta c \in \mathbb{R}^+$, for any $R \subseteq R_{s \to d}$, and a family of sets $\{R_1, R_2, \ldots, R_n\}$ such that $\bigcup_{i=1}^{n} R_i = R$, it is the case that $\nabla(\bigcup_{i=1}^{n} \nabla R_i) = \nabla R$.

Proof. The proof follows by induction over n, the number of members in the family. There are three base cases:

Case a. n=0. Thus, $R = \emptyset$. Since $\nabla R \subseteq R$, it must be that $\nabla R = \emptyset$. Additionally since there are no members in the family, the union $\bigcup_{i=1}^{n} \nabla R_i$ is also empty. Consequently, $\nabla(\bigcup_{i=1}^{0} \nabla R_i) = \nabla R$.

Case b. n=1. Since there is only one member in the family, it must be the case that $R_1 = R$. Thus, the proposition reduces to $\nabla \nabla R = \nabla R$, which is Property 2. Consequently, $\nabla(\bigcup_{i=1}^{1} \nabla R_i) = \nabla R$.

Case c. n=2. Thus, the proposition reduces to $\nabla(\nabla R_1 \cup \nabla R_2) = \nabla R$, which is Theorem 7 for $S = R_1$ and $T = R_2$. Consequently, $\nabla(\bigcup_{i=1}^{2} \nabla R_i) = \nabla R$.

The inductive step assumes that the proposition holds for n=k−1 family members. That is, if $X \subseteq R_{s \to d}$, and $\{X_1, X_2, \ldots, X_{k-1}\}$ is a family of sets such that $\bigcup_{i=1}^{k-1} X_i = X$, then $\nabla(\bigcup_{i=1}^{k-1} \nabla X_i) = \nabla X$. The variables have been renamed for clarity. Proving the proposition for n=k members: Let $R \subseteq R_{s \to d}$, and let $\{R_1, R_2, \ldots, R_k\}$ be a family such that $\bigcup_{i=1}^{k} R_i R$. Proving:

$$\nabla \left( \bigcup_{i=1}^{k} \nabla R_i \right) = \nabla R. \qquad \text{[EQUATION 3]}$$

Upon substituting $\bigcup_{i=1}^{k} \nabla R_i$ for R:

$$\nabla \left( \bigcup_{i=1}^{k} \nabla R_i \right) = \nabla \left( \bigcup_{i=1}^{k} R_i \right). \qquad \text{[EQUATION 4]}$$

Upon separating the $k^{th}$ terms, the following is obtained:

$$\nabla \left( \bigcup_{i=1}^{k-1} \nabla R_i \cup \nabla R_k \right) = \nabla \left( \bigcup_{i=1}^{k-1} R_i \cup R_k \right). \qquad \text{[EQUATION 5]}$$

Upon applying Property 1, the following is obtained:

$$\nabla \left( \nabla \left( \bigcup_{i=1}^{k-1} \nabla R_i \right) \cup \nabla R_k \right) = \nabla \left( \bigcup_{i=1}^{k-1} R_i \cup R_k \right). \qquad \text{[EQUATION 6]}$$

Letting $X = \bigcup_{i=1}^{k-1} R_i$. Then, according to the inductive hypothesis, $\nabla(\bigcup_{i=1}^{k-1} \nabla R_i) = \nabla X$. Upon substituting, the following is obtained:

$$\nabla(\nabla X \cup \nabla R_k) = \nabla(X \cup R_k). \qquad \text{[EQUATION 7]}$$

This result corresponds to Theorem 7 with $S=X$ and $T=R_k$.

The properties allow the free application of the $\nabla_{\Delta c}$ operator to terms of union expressions to which $\nabla$ is applied. The theorems and properties hold only when the value of $\Delta c$, the size of the reaction window, is identical in all uses of $\nabla_{\Delta c}$.

As mentioned above, the Distributed $\Delta c$ Protocol mimics the distribution scheme used by distance-vector protocols such as RIP. The Propagation Routine facilitates the distribution of learned routes to upstream nodes while the Update Routine prepends the applicable edge to each propagated route and re-evaluates the useful learned routes. If the routines loop sufficiently many times at each node and the network is connected, then each node eventually learns the best route to satisfy $\Delta c$ for every destination. Beyond this point, any newly-learned routes are useless and are, therefore, filtered by $\nabla$, thereby indicating route convergence for the network.

If the execution of the Distributed $\Delta c$ Protocol is synchronized among the nodes, the computations are identical to those of the $\Delta c$ Algorithm. Because of Properties 1, 2, and 3, however, asynchronous execution eventually yields the same result as synchronous execution. The application of $\nabla$ in Step 5 of the Update Routine of the Distributed $\Delta c$ Protocol to the intermediate results does not change the final result regardless of the order in which routes are computed and filtered as long as $\nabla$ is the last operation performed.

One caveat involving the application of the Distributed $\Delta c$ Protocol is that either the links are bidirectional or there is some mechanism that enables the nodes to send routing information to their upstream peers. This problem is apparent in that the Propagation Routine executes send using an inbound link, which is opposite to the normal flow of the data.

$\Delta c$ Label Distribution Protocol

In a network, a node does not typically communicate complete routes to its neighbors. Instead, simple next hop information is distributed from node to node, thereby implicitly constructing paths. Non-limiting examples of the hop information may be an IP address in RIP or an outbound label in MPLS. The Distributed $\Delta c$ Protocol is thus modified so that $X_{s,d}$ no longer holds complete routes, but a set of tuples $(l_i, l_o, e_o, c)$ consisting of an incoming label, outbound label, outbound link and cost.

Two definitions are necessary to map labels to corresponding paths. Let L be a set of labels. Then, let $Y_s: L \to (L \cup \{\lambda\}) \times (E \cup \{\lambda\})$ be the function that maps incoming labels and edges to outgoing labels and edges at node s. Formally:

Definition 7. $Y_s(l_i) = (l_o, e_o) \Leftrightarrow (l_i, l_o, e_o, c) \in X_{s,d}$ for some $c \in \mathbb{R}^+$ and $d \in \mathbb{N}$.

Thus, the function to construct explicit routes originating from s is defined recursively as:

Definition 8.

$$R_s(l_i) = \begin{cases} \langle s \rangle & \text{if } l_o = \lambda \\ \langle s, e_o, \text{head}(e_o) \rangle \cdot R_{\text{head}(e_o)}(l_o) & \text{otherwise,} \end{cases} \text{ where}(l_o, e_o) = Y_s(l_i).$$

This definition captures the essence of connection-oriented networks and MPLS networks. The base case corresponds to a packet that has arrived at its destination. The recursive case corresponds to a packet that is forwarded by s along an outbound edge $e_o$ to continue processing at the next hop.

The distributed protocol can now be formally refined to accommodate MPLS labels and generate hyperspeed LSPs. Note that newlabel( ) in Equation 8, the $\Delta c$ Label Distribution Protocol, below generates a unique label each time it is called.

Propagation Routine:
Step

[EQUATION 8]
a. Initialize all entries in $X_s$ to $\emptyset$
b. $X_{s,s} \leftarrow \{(\text{newlabel}(\ ), \lambda, \lambda, 0)\}$
c. loop
d.     for all $X_{s,d} \in X_s$
e.       $L_{s,d} \leftarrow \bigcup_{(l_i, l_o, e_o, c) \in X_{s,d}} \{(l_i, c)\}$
f.     end for
g.     for all $e \in E_\Gamma^-(s)$ do
h.       send $(e, L_s)$
i.     wait t
j. end loop Update Routine:
Step 1. loop
2.    recv $(e, L_u)$
3.    for all $L_{u,d} \in L_u$ do
4.      $S \leftarrow \bigcup_{(l_o, c) \in L_{u,d}} \{(\text{newlabel}(\ ), l_o, e, c + \text{cost }(e))\}$
5.      $X_{s,d} \leftarrow \nabla^*(S \cup X_{s,d})$
6.    end for
7. end loop Note that ∇ is not used precisely according to its definition, because its parameter should be a set of routes, not a set of tuples. However, the cost of a route is known from its associated tuple, so we let ∇* select the subset of tuples corresponding to useful routes.

Supporting Theorems and Proofs

Let A be the set of routes computed by the Distributed Δc Protocol, and B be the set of routes computed by the Δc Label Distribution Protocol. Let $A_n$ be the subset of A that contains all routes in A of length n. To formally define B, consider the label l of each tuple in X (the tuple belongs to some $X_s$). B contains the route $R_s(l)$ for each such label. Consider the base case of routes of length zero. The Distributed Δc Protocol constructs these routes in Step 2 of the Propagation Routine. Likewise, the Δc Label Distribution Protocol populates the routing table with a λ entry in Step 2 of the Propagation Routine. Thus, there exists a label l such that $R_s(l) = \langle s \rangle$ constitutes the same route. Consequently, $A_0 = B_0$. Note that the cost indicated in $X_{s,s}$ for the Δc Label Distribution Protocol is indeed the correct cost of the route $\langle s \rangle$.

For the inductive step, assume $A_{n-1} = B_{n-1}$ and consider $A_n$ and $B_n$. A route p in $A_n$ is constructed in Step 4 of the Update Routine in the Distributed Δc Protocol. Thus, r in Step 4 is a route of length n−1 and exists in $A_{n-1}$ and $B_{n-1}$. Clearly, cost (p)=cost (e)+cost (r). Considering Step 4 in the Update Routine of the Δc Label Distribution Protocol, it is clearly the case that an entry corresponding to the same route is constructed by the Δc Label Distribution Protocol. Let l be the label of this new entry in $X_s$. Thus, since u=head (e), we have $R_s(l) = \langle s, e, u \rangle \cdot R_u(l_o)$. Because $B_{n-1}$ is composed of routes constructed by R, let $r = R_u(l_o)$. Consequently, $p = R_s(l) \in B_n$, so $A_n \subseteq B_n$. The proposition $B_n \subseteq A_n$ is proved in a similar manner. Thus, $A_n = B_n$, and finally, A=B. Note that the cost indicated by the entry in $X_{s,d}$ of the Δc Label Distribution Protocol is correct, assuming that the cost of the route of length n−1 is correct. Therefore, the Δc Label Distribution Protocol is a suitable substitute for the Distributed Δc Protocol, especially for MPLS networks.

Generally, it is infeasible to restart Δc-LDP every time the network topology changes. Instead, Δc-LDP should run constantly and adapt to changes in topology and link costs. Two modifications are necessary to enable Δc-LDP to adapt to network changes. First, if a neighbor advertises a label that the recipient router has recorded from an earlier advertisement, the recipient should adjust the cost in the existing entry to reflect the new advertisement. Second, if a neighbor sends an advertisement where some previously-advertised label is missing, the recipient router should delete the entry for the label.

When the cost of a link changes, the change is reflected in the next update. The change then cascades along all the affected paths, potentially changing the set of useful routes, until the network converges once again. If routes become useless, or a network link fails, the affected routes are not advertised in the next update. This causes the cascading deletion of route entries, which changes the set of useful routes, until the network converges once again.

Routes

Routes may need to be restricted in order to implement access control or traffic engineering. Route restrictions may also be required to reflect certain hardware limitations. By way of a non-limiting example, if cut-through switching is used on half-duplex links, then no link should be repeated consecutively in a route.

Because the Δc Algorithm is designed to work on strongly connected digraphs, an equivalent digraph must represent the restrictions. For the purpose of route restrictions, two digraphs are equivalent if they contain the same routes up to edge labels. Node names are not considered, and two edges may share the same label. A digraph $\Gamma_r$ is said to implement a restriction r on another digraph Γ, if $\Gamma_r$ contains all the routes in Γ allowed by r.

Because a sequence of edge labels (i.e., a route) can be treated as a string, and because walks in network digraphs work similarly to walks in state transition graphs, it is natural to represent route restrictions as regular expressions over the set of labeled links in a network. Because routes in networks can begin and end at any node, an equivalent digraph can implement only certain restrictions. Restrictions expressed in the form −(·*p·*), where p is a regular expression and the wildcard "·" denotes any label, are shown to be implementable. The "−" operator is not traditionally used in regular expressions; however, it is used here to indicate complementation. Thus, the rule −(·*p·*) denotes all the routes that do not contain p as a subroute.

Constructing an equivalent network digraph to enforce a rule r on a network Γ involves two steps. The first step is to construct a digraph $\Gamma_r^*$ that represents the rule. $\Gamma_r^*$ contains every possible edge label sequence that obeys r. The second step builds the equivalent digraph $\Gamma_r$ that contains the intersection of the set of routes in Γ and the set of routes in $\Gamma_r^*$. Because the result is a digraph, the Δc Algorithm executes correctly under any restriction in the given form, as long as $\Gamma_r$ is also strongly connected. Note that building $\Gamma_r$ is not necessary to execute the Δc Algorithm on a restricted network; $\Gamma_r$ is necessary only for proofs. The restriction can be enforced in any convenient manner.

Let r=−(·*p·*) where p is the prohibited subroute. Equation 9, the algorithm for constructing $\Gamma_r^*$ (i.e., the first step in constructing the equivalent digraph) is specified below.

Step a. Build an NFA that accepts ·*p·* ("·" requires an individual edge for each label in Γ).

b. Convert the NFA to a DFA.

c. Build the corresponding transition graph. [EQUATION 9]

d. Delete all double circles and corresponding incident edges.

e. Delete the start state indicator.

Theorem 8. The digraph $\Gamma_r^*$ produced by Equation 9 contains walks that include every edge label sequence except those containing p.

Proof. Consider the Deterministic Finite (or Finite-state) Automaton (DFA) corresponding to the complement of L (·*p·*). It may be constructed by taking the DFA from Step b with the complement of its final states. Because the final state in the Non-deterministic Finite Automaton (NFA) has a self-loop for every possible label, any transition from a final state in the DFA ends in another final state. Similarly, the loop at the start state of the NFA causes every state in the DFA to involve the original start state. Therefore, no matter where a walk starts, if it contains p, then it must end in a final state of the DFA. $\Gamma_r^*$ is essentially the complementary DFA. The final states in the DFA are dead states in the complementary DFA and are, consequently, deleted to create the digraph $\Gamma_r^*$. All the remaining nodes correspond to final states in the complementary DFA. Because all the nodes involve the original start state, and every node corresponds to a final state in the complementary DFA, walks that start and end at any node in $\Gamma_r^*$ constitute the members of the complement of L (·*p·*).

A formula for building a digraph with the set of walks equal to the intersection of the sets of walks in two digraphs $\Gamma_1=(N_1, E_1)$ and $\Gamma_2=(N_2, E_2)$ is $\Gamma=(N, E)$ where $N=N_1 \times N_2$ and E is defined such that if $(n_1, m_1, l) \in E_1$ and $(n_2, m_2, l) \in E_2$, then $((n_1, n_2), (m_1, m_2), l) \in E$.

Theorem 9. The set of routes in the digraph $\Gamma$ is equal to the intersection of the sets of walks in the two original digraphs $\Gamma_1$ and $\Gamma_2$.

Proof. The digraph $\Gamma$ is constructed in a similar manner as a DFA that accepts the intersection of the languages accepted by two DFAs. Given the above formula, it is easy to show that for a walk (considering the sequence of edge labels) to exist in $\Gamma$, the same walk must exist in both $\Gamma_1$ and $\Gamma_2$. Note that the formula may generate standalone nodes that can be deleted without affecting the result.

Thus, any rule expressed as $-(\cdot^*p\cdot^*)$ can be implemented in any digraph $\Gamma$ via an equivalent digraph. Consequently, Equation 1, the $\Delta c$ Algorithm, is compatible with such restrictions.

Rule expressions can be made more expressive by introducing and ($\wedge$), or ($\vee$) and complementation ($-$) operators.

Theorem 10. If the rule expressions $r_1$ and $r_2$ are compatible with Equation 1, the $\Delta c$ Algorithm, then the rule expression $r_1 \wedge r_2$ is compatible with Equation 1.

Proof. Since $r_1$ and $r_2$ are compatible, they can be expressed as $-(\cdot^*p\cdot^*)$ and $-(\cdot^*q\cdot^*)$, respectively. Substituting these terms yields $-(\cdot^*p\cdot^*) \wedge -(\cdot^*p\cdot^*)$, which can be simplified as $-(\cdot^*(p+q)\cdot^*)$. A second proof involves the application of the two restrictions in sequence. First, apply $r_1$ to $\Gamma$ to obtain $\Gamma_{r_1}$; then, apply $r_2$ to $\Gamma_{r_2}$ to obtain $\Gamma_{r_1 \wedge r_2}$.

Theorem 11. If the rule expressions $r_1$ and $r_2$ are compatible with Equation 1, the $\Delta c$ Algorithm, then the rule expression $r_1 \vee r_2$ is compatible with Equation 1.

Proof. Since $r_1$ and $r_2$ are compatible, they can be expressed as $-(\cdot^*p\cdot^*)$ and $-(\cdot^*q\cdot^*)$, respectively. Substituting these terms yields $-(\cdot^*p\cdot^*) \vee -(\cdot^*q\cdot^*)$. The regular expressions $\cdot^*p\cdot^*$ and $\cdot^*q\cdot^*$ represent regular languages. Because the two expressions begin and end with $\cdot^*$, there exist two corresponding NFAs without $\lambda$ transitions where the start and final states have self-loops for each symbol in the alphabet. Excluding $\lambda$ transitions allows an NFA to be built that recognizes the intersection of the two regular languages. The start and final states in the resulting NFA also have self-loops for each symbol in the alphabet. Thus, there exists a regular expression corresponding to the intersection of L $(\cdot^*p\cdot^*)$ and L $(\cdot^*q\cdot^*)$ that begins and ends in $\cdot^*$. Consequently, the equivalent rule expression can be expressed in the compatible form $-(\cdot^*p\cdot^*)$.

Theorem 12. Even if the rule expression r is compatible with $\Delta c$, the rule expression $-r$ may not be compatible with $\Delta c$.

Proof. Since r is compatible, it can be expressed as $-(\cdot^*p\cdot^*)$. Substituting the term in $-r$ yields $\cdot^*p\cdot^*$. Consider the case where p=a in a network with two labels, a and b. The rule expression requires all the paths to contain a. This effectively prohibits route b. The only compatible rule that prohibits b is $-(\cdot^*b\cdot^*)$, but it also prohibits ab, which should be allowed by $-r$. Thus, rules containing the "$-$" operator (except those that are required to fit the form $-(\cdot^*p\cdot^*)$), may not be compatible with $\Delta c$.

Theorem 13. The route restriction where no link can appear consecutively in a route is compatible with $\Delta c$.

Proof. Consider a network with edge labels $\{l_1, l_2, \ldots l_n\}$. The restriction can be Expressed $-(\cdot^*(l_1l_1,+l_2l_2+ \ldots + l_nl_n)\cdot^*)$, which is compatible with $\Delta c$.

Different restrictions have different effects depending on the original network topology. For instance, the route restriction in Theorem 13 requires the original network to have at least one loop; otherwise, the result is a digraph that is not strongly connected. If the $\Delta c$ Algorithm is applied to a digraph that is not strongly connected, it still finds valid routes if they exist, but it does not guarantee the existence of enough routes to satisfy the desired reaction window.

$\Delta c$-LDP Performance Analysis

Several aspects of the performance of the $\Delta c$-LDP were analyzed using network simulation experiments. The performance metrics include:

Routing Table Size: Routing Table Size is a metric indicating the additional memory that is required at each router (node) to track suboptimal paths. It is computed as the total number of routing table entries for all the nodes divided by the square of the node count. Where only optimal paths are computed, the metric is equal to one.

Actual $\Delta c$: Actual $\Delta c$ is a metric indicating how close $\Delta c$-LDP comes to the target $\Delta c$ without being less than the target $\Delta c$. For a given source and destination, the difference in delay corresponds to the difference of the costs of the greatest-cost paths and least-cost paths from the source to the destination. Since there are multiple source-destination combinations, the metric is computed as the average difference for all the combinations.

Path Length Difference. Path Length Difference is a metric indicating the number of additional hops a packet traveling along a suboptimal path must take compared with an optimal path. The metric is computed in the same way as the actual $\Delta c$, except that length is used instead of cost.

Convergence Time: Convergence Time is a metric measuring the time taken for network 10 to stabilize after $\Delta c$-LDP is started. Convergence is deemed to occur when no routing table changes are detected for a complete update period.

The primary variables considered in the simulation experiments include:

Target $\Delta c$: Target $\Delta c$ is a variable defining the target reaction window. Different applications may have different requirements, so the effect of this variable on $\Delta c$-LDP execution is a consideration.

$\sigma$ Link Delay: The standard deviation ($\sigma$) of the Link Delay addresses the different lengths, bandwidths and transmission delays for different links. $\Delta c$-LDP seeks to construct paths with target differences in delays. Thus, the effect of the standard deviation of link delays on $\Delta c$-LDP execution is of concern.

Node Count: The Node Count variable is used to evaluate the performance of $\Delta c$-LDP in large networks.

Link Count: Link Count variable is used to evaluate the performance of $\Delta c$-LDP. If there are a greater number of links, then there are a greater number of available alternate paths, whereby each of the alternate paths may have different costs.

Because the applicable restrictions apply only to links 16 and a simulation experiment focusing on link count yields results that are easy to interpret, the simulation experiment was performed eight ($=2^3$) times with different combinations of three restrictions. The applicable restrictions were:

No link can connect a node to itself: Having a self-loop gives a node an additional option for adding an arbitrary delay, but the overall effect is the same as having additional queuing memory.

No two links can connect the same two nodes: Two links between the same two nodes provide alternate paths with differing costs, but with the same sequence of hops.

No path can have the same link appear consecutively: It is counterintuitive for a router to "bounce" a packet back along the same link on which the packet was received. This restriction may be required for some network technologies (e.g., cut-through networks with half-duplex links).

Network Simulation

The simulation experiments employed a discrete event simulator. The simulator models the behavior of a network with bidirectional full-duplex links that queue packet transmission events according to a total delay computed based on the propagation delay, bandwidth and packet size. Network nodes discover the estimated link costs using ping packets. The simulation experiments implemented Δc-LDP with extensions to handle link costs changes and link failures.

Each simulation experiment was executed on a randomly generated network with varying link costs and a strongly connected topology. Link propagation delays were sampled from a normal distribution. Bandwidth was expressed in scientific notation, where the coefficient was sampled from a uniform distribution and the exponent was selected from a subset of integers with equal probability.

TABLE 1

Simulation variables.

| Variables | Value |
| --- | --- |
| Node Count | 2 |
| Link Count | 1 |
| Target Δc | 0.004 sec |
| Update Period | 1 sec |
| Mean Link Delay | 0.002 sec |
| σ Link Delay | 0.0001 sec |
| Route Restrictions | Disabled |
| Duplicate Links | Disabled |
| Self Loops | Disabled |

Each simulation experiment used ten samples for each value of a variable, and computed the mean and standard deviation of each performance metric. Since it would have been cost and time prohibitive to test Δc-LDP for all possible combinations of values of the variables, a few representative samples were selected, and the results were used to guide the selection of new samples. The simulation experiments and the results obtained are discussed below. Unless otherwise specified, the variables are set as shown in Table 1.

Target Δc

The simulation investigated whether the Routing Table Size metric grows linearly with respect to Target Δc. One starting assumption was that actual Δc would also vary linearly because Δc-LDP was designed to find an Actual Δc that is nearest to the Target Δc. Additional starting assumptions were the Path Length Difference and Convergence Time metrics would vary linearly because the link costs were selected to have a low variance in this simulation experiment.

The simulation was repeated for three network sizes. The first network had two nodes with one link connecting them. The second network had three nodes and two links, and the third network had four nodes and three links.

Figure 15:
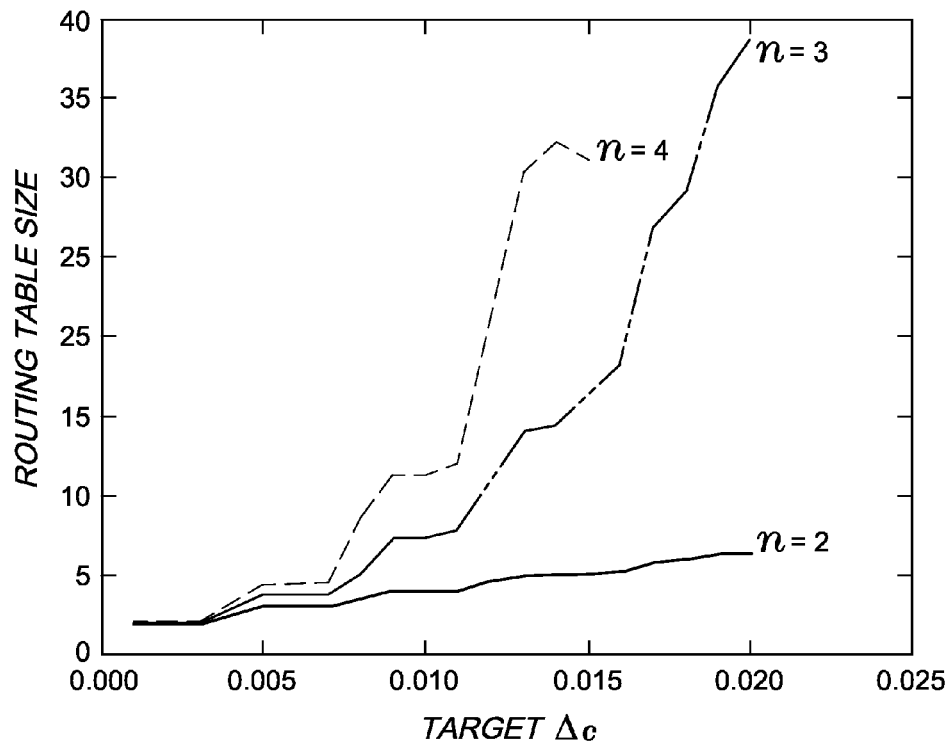
FIG. 15 depicts a graph of routing table size versus $\Delta c$ for three notional networks.
Figure 15A:
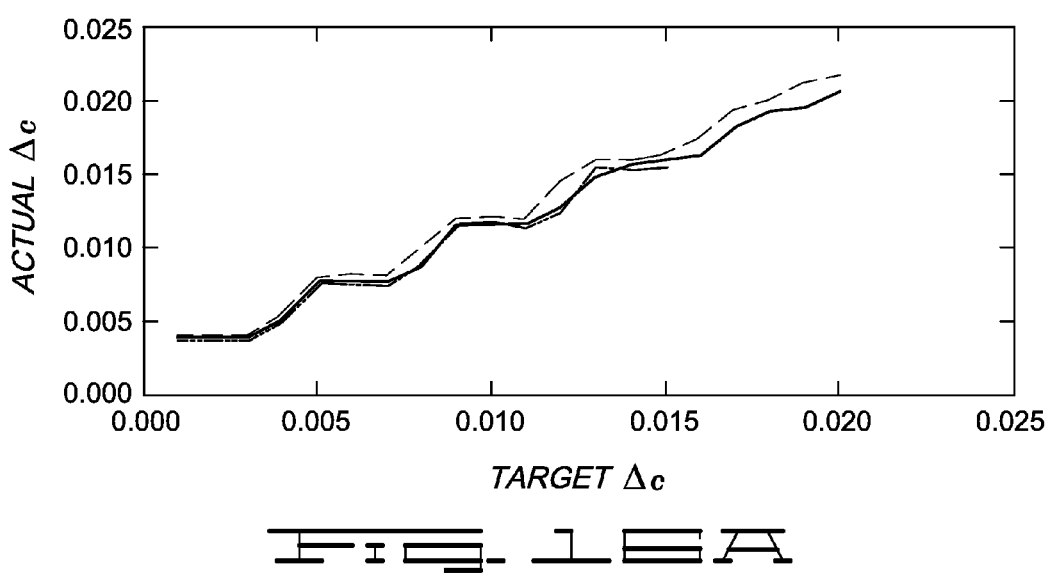
Figure 15B:
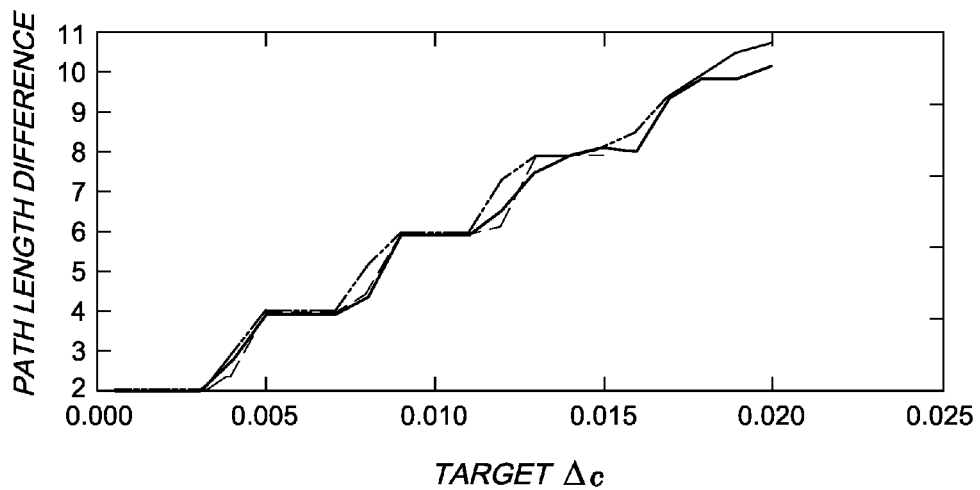
Figure 15C:
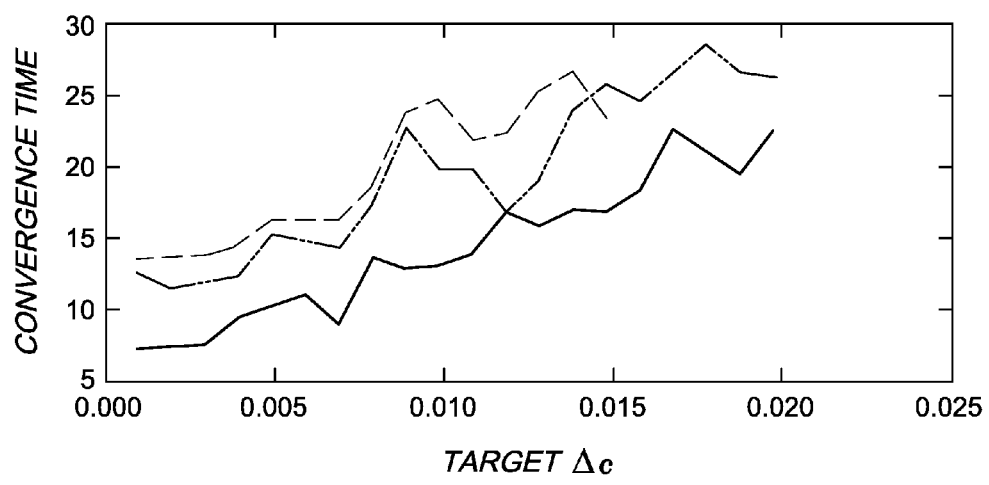

Referring to FIG. 15, in the case of the two-node network (n=2), the Routing Table Size metric grows linearly with respect to Target Δc. However, when additional nodes are introduced, Routing Table Size grows much faster. Without intending to be bound by theory, for the three-node network (n=3), it appears that Routing Table Size doubles for every 0.005 increment in Target Δc, suggesting exponential growth. The simulation for the four-node network (n=4) was terminated early (with Target Δc=0.015 sec) due to the expense of the particular simulation.

Given that average link cost is 0.002 seconds, the results of the simulation experiment indicate that the desired delay should not exceed the average link cost by very much. As the requested delay (Target Δc) grows, Δc-LDP has to branch among many more possible paths to discover the quickest path with the requested delay. The amount of branching can quickly consume router memory in the case of networks whose nodes have many links.

Referring to FIGS. 16A-C, the trends for the three performance metrics are respectively illustrated as: Actual Δc, Path Length Difference and Convergence Time for increasing values of Target Δc. The performance metrics illustrated vary linearly.

σ Link Delay

This simulation investigated if increasing σ Link Delay would improve Δc-LDP performance. Because Δc-LDP seeks to produce paths with different costs, having a wider selection of link costs potentially improves performance.

The simulation was performed using a four-node, three-link network with Target Δc=0.01 sec, which is about five times the average link cost (Mean Link Delay). The simulation was performed starting with a standard deviation (σ) of zero for randomly generated link delays. The standard deviation was incremented by 0.0001 for each subsequent run.

Figure 17:
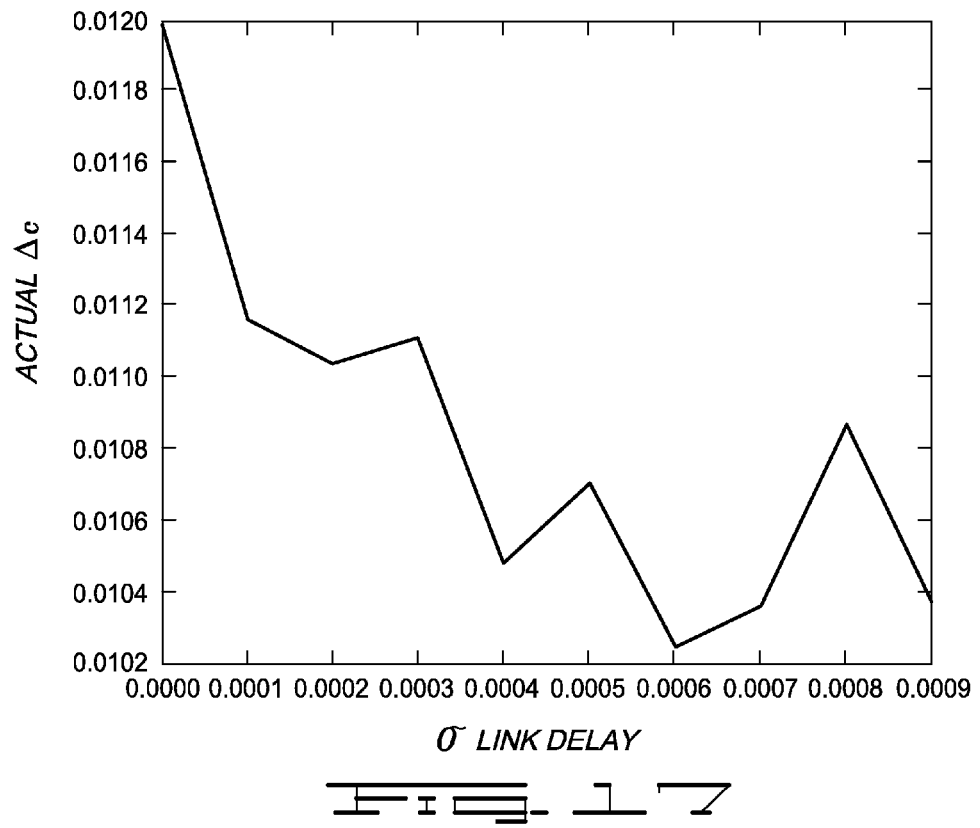
FIG. 17 depicts a graph of actual $\Delta c$ versus $\sigma$-link delay values.

FIG. 17 shows the effect on the Actual Δc metric. Δc-LDP tends to perform better with respect to the Actual Δc metric when the link delays have greater variance. In this situation, Δc-LDP has wider choices when searching for paths with a given Target Δc. Thus, when link delays vary more widely, Δc-LDP can more closely match the Target Δc.

Figure 18A:
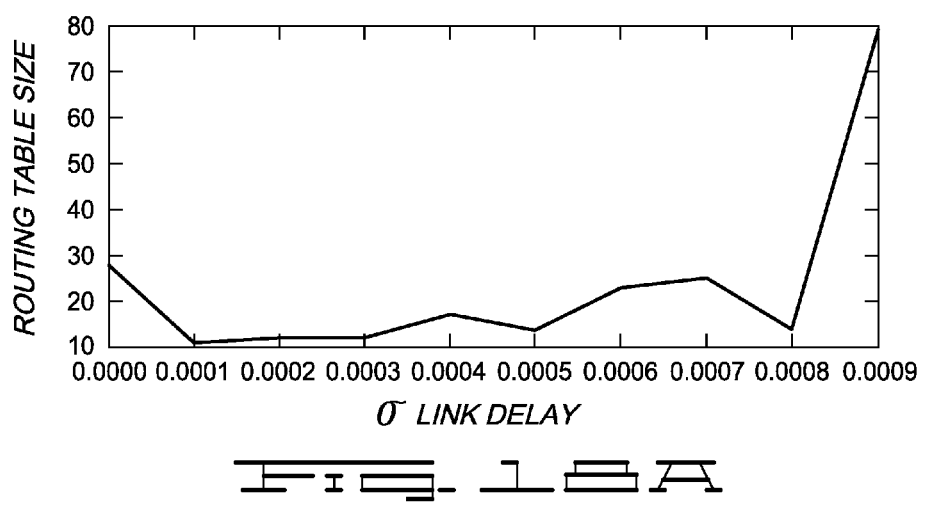
FIG. 18A depicts a graph of trends in performance metrics for actual $\Delta c$ values versus increasing $\sigma$-link delay values.
Figure 18B:
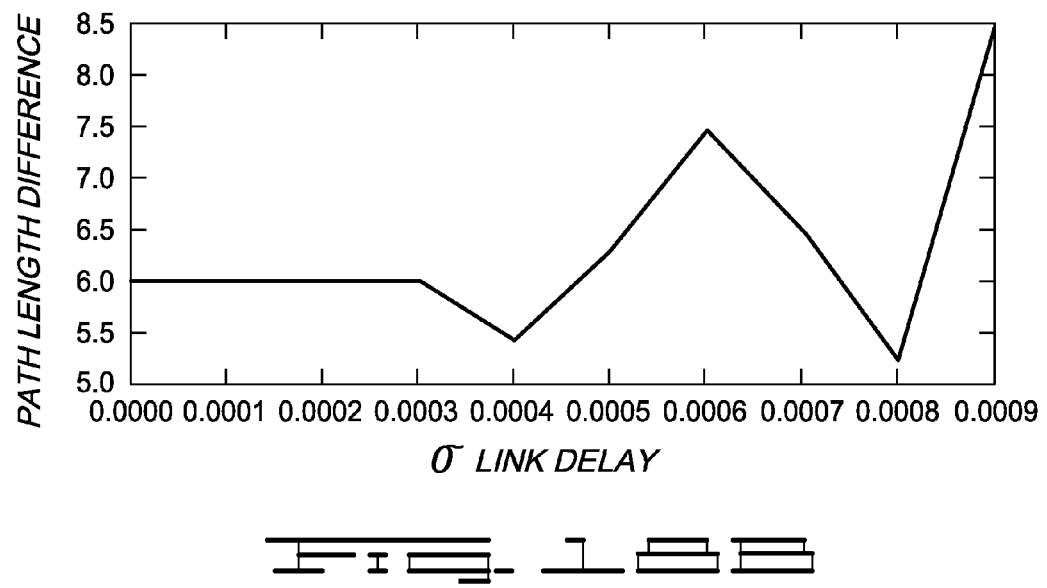
FIG. 18B depicts a graph of trends in performance metrics for path length difference values versus increasing $\sigma$-link delay values.
Figure 18C:
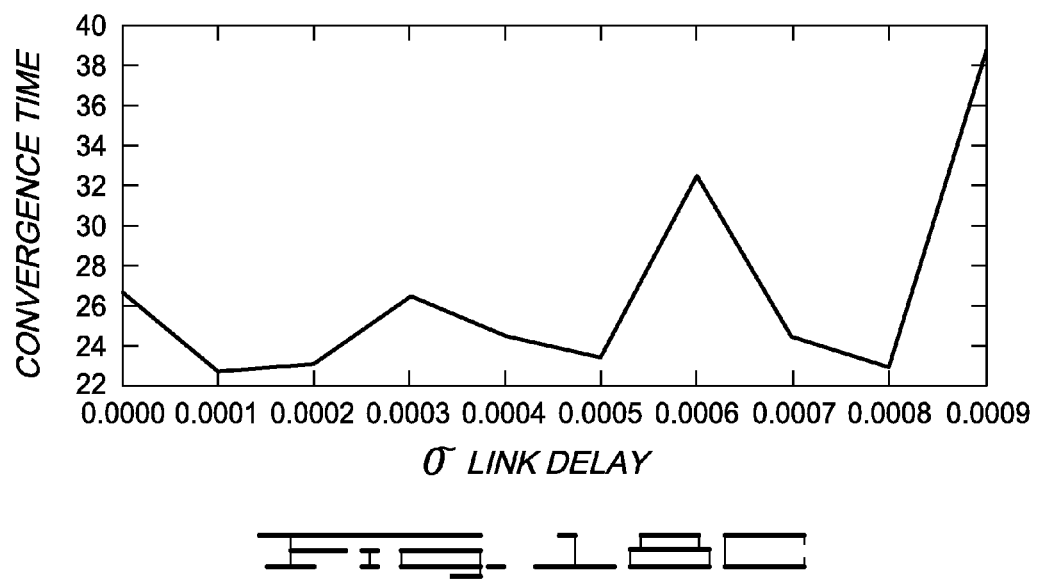
FIG. 18C depicts a graph of trends in performance metrics for convergence time values versus increasing $\sigma$-link delay values.

Referring to FIGS. 18A-C, the effect of increasing a Link Delay on the other three performance metrics is shown. Δc-LDP becomes more erratic as the link costs vary more widely. However, a standard deviation of zero (i.e., all links have the same exact costs) caused Δc-LDP to perform poorly. Without wishing to be limited by theory, we believe that at least part of poor performance is because Δc-LDP sees many paths with the same total costs and treats ties equally. A path is not useless unless its cost is greater than a path that already meets the criteria, so Δc-LDP tends to keep a large list of ties. The first increment in a Link Delay greatly improves performance, but additional increments appear to degrade performance. Without wishing to be limited by theory, we believe that at least part of the performance degradation is caused by links with delays that are near zero (relative to other link delays). When the link costs vary too greatly, some delays are sampled near zero causing Δc-LDP to "panic," whereby Δc-LDP generates numerous paths that traverse the near-zero link repeatedly. The mass of routing information then propagates throughout the network, overwhelming router memory.

Node Count

The previous simulations addressed the effects of network size on Δc-LDP performance. The following simulations attempt to distinguish the effects of the Node Count and Link Count variables on Δc-LDP performance.

The Node Count simulation was performed on a nine-link network with Target Δc=0.004 sec, which is about twice the average link cost (Mean Link Delay). Starting with a node count of three, each iteration adds another node for a total eight iterations. The last iteration involving a network with ten nodes operates on trees. Further iterations would require an increase in the number of links.

FIG. 19 shows the effect on the Routing Table Size metric. This metric compares the routing table size for Δc-LDP with standard optimal routing (Dijkstra's Algorithm). Thus, the metric already compensates for the number of nodes in the network. Nevertheless, FIG. 19 shows a decrease in Routing Table Size as more nodes are added to the network. Since there are more nodes in the network, but the same number of links, the links become more widely spread within the network, and any given node tends to have fewer incident links. Thus, the number of paths a node needs to consider tends to decrease, so the Routing Table Size metric also decreases.

The total number of paths in the network, however, increases because there are more destinations. Examining the three-node network, there are 40 times more paths per node than optimal routing, corresponding to 360 routing table entries. For the ten-node network, there are about 500 routing table entries.

FIG. 20A shows the effect on the Actual $\Delta c$ metric. As the network gains more nodes, the overall accuracy of $\Delta c$-LDP diminishes. Because the number of links is held constant, additional nodes result in fewer links per node. Thus, at each node there are fewer options for a path to take, so there are fewer paths in the network per source and destination. Without wishing to be limited by theory, we believe that with fewer paths, the alternate path is likely to fall further from Target $\Delta c$ than it would if there were more paths.

Figure 20B:
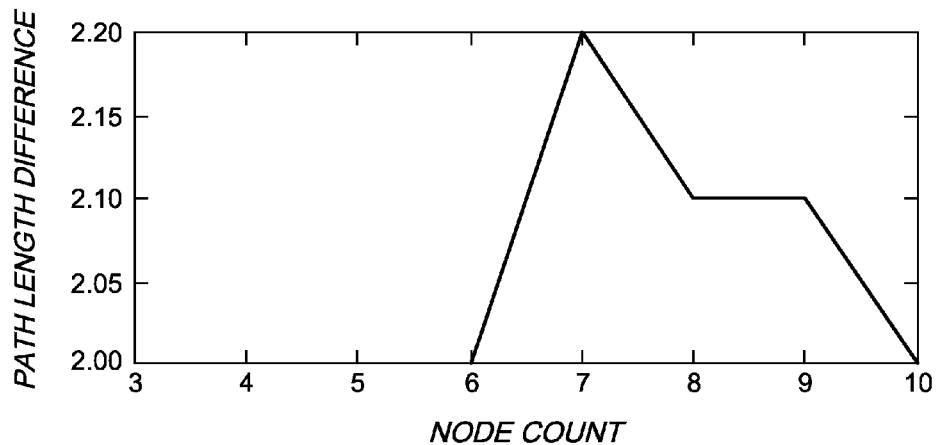
FIG. 20B depicts a graph of path length difference values versus node count.

FIG. 20B shows the effect on the Path Length Difference metric. This metric is not substantially affected by the Node Count variable. Because the Target $\Delta c$ is about twice the Mean Link Delay, the value of Path Length Difference must be two or more. Without wishing to be limited by theory, we believe that when there are more nodes, it is more likely that an alternate path will require three additional links. This is similar to the trends seen above in the case of the Actual $\Delta c$ metric.

Figure 20C:
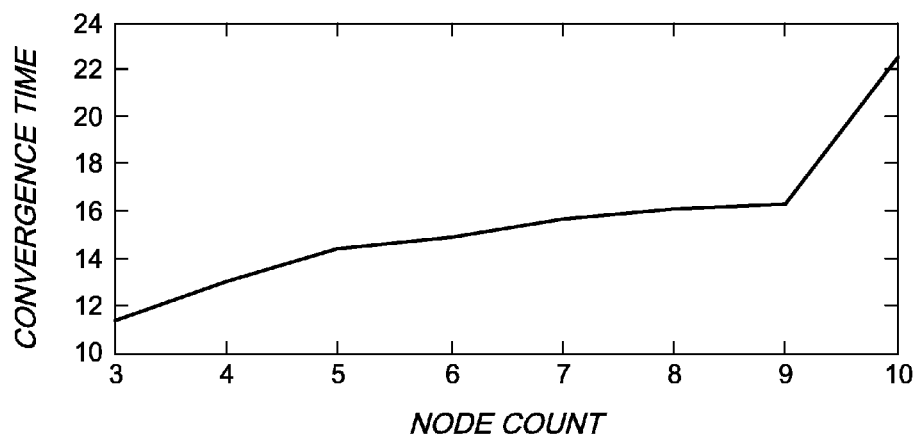
FIG. 20C depicts a graph of convergence time values versus node count.

FIG. 20C shows the effect on the Convergence Time metric. Larger networks require more time to converge. Without intending to be bound by theory, on the average, it appears that each additional node requires one or two more iterations.

Link Count

The Link Count simulation was performed to clarify the effects of the Link Count variable on $\Delta c$-LDP performance. Specifically, the simulation identified whether extra links improve the performance measured in terms of Actual $\Delta c$ and Path Length Difference, but degrade the performance measured in terms of Routing Table Size and Convergence Time. The simulation was conducted on a seven-node network. Starting with six links, the link count was incremented by one in every subsequent run until the network had twenty links.

Figure 21:
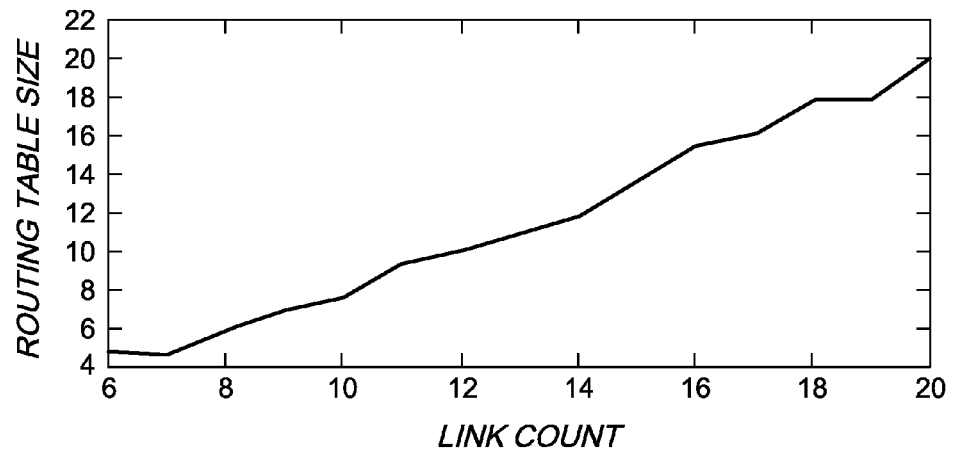
FIG. 21 depicts a graph of routing table size versus link count.

FIG. 21 shows the effect on the Routing Table Size metric. FIG. 21 demonstrates a linear relationship between Link Count and Routing Table Size. Without intending to be bound by theory, the behavior is likely because new links provide $\Delta c$-LDP with additional options with computing paths. These additional options require additional entries in the routing table.

Figure 22A:
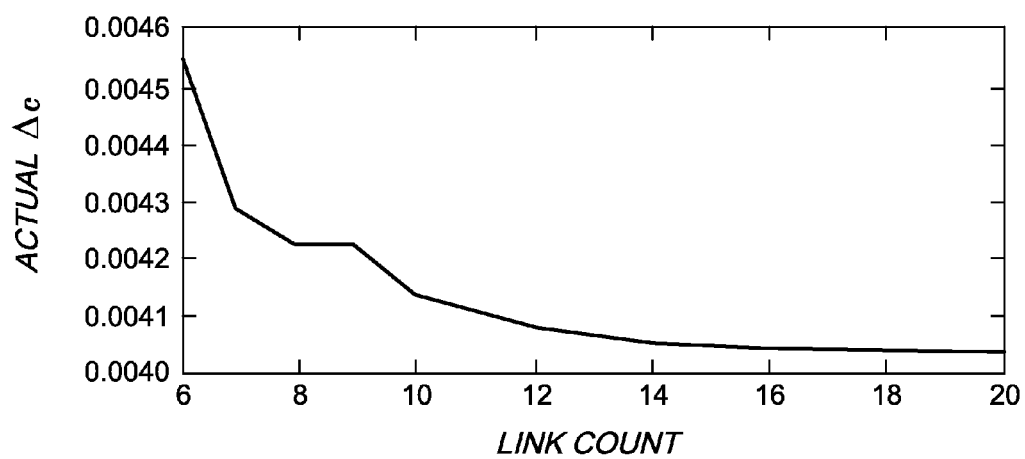
FIG. 22A depicts a graph of actual $\Delta c$ values versus link count.

FIG. 22A shows that additional links improve the accuracy of $\Delta c$-LDP. The additional path options provided by new links enable $\Delta c$-LDP to find a path close to Target $\Delta c$.

FIG. 22B shows that the Link Count variable does not have a predictable effect on the Path Length Difference metric. Based on the results of the previous simulation experiments, it was anticipated that the metric would improve as the Link Count value increased, but the simulation results suggest that there is no discernible effect.

FIG. 22C shows that additional links cause $\Delta c$-LDP to converge more rapidly. The expected result was the convergence time would degrade. Without intending to be bound by theory, the reason for improved convergence is that additional links cause $\Delta c$-LDP to explore more options early in its execution; whereas, with the few links $\Delta c$-LDP takes more time to traverse the network. The alternate paths act as "shortcuts" through the network.

Route Restrictions

The Route Restrictions simulation repeated the simulation involving the Link Count variable eight more times, once for each combination of network and route restrictions. The maximum number of links tested in these experiments was thirteen. The time required to simulate $\Delta c$-LDP on a network with many links but few nodes can be prohibitive.

The results show the restrictions on the network structure (i.e., restrictions on self-loops and duplicate links) have little effect on $\Delta c$-LDP with respect to the established metrics. Conversely, precluding immediate link repetition in computed paths greatly affects the performance with respect to all the metrics. In the following graphs, the lines corresponding to unrestricted paths are labeled u, and those corresponding to restricted paths are labeled r. Because a seven-node, six-link network is a tree (i.e., a graph without loops), the route restriction prevents the construction of any alternative path. Thus, the data point at l=6 for any r-labeled line is invalid.

FIG. 23 shows that the restriction decreases the number of entries in the routing table. As the number of links increase, however, the distinction diminishes. Naturally, restricting the paths causes fewer paths to be considered, so fewer routing table entries are required. More links provide more alternate paths, which reduces the effect of the restriction. By the time there are thirteen links, the r and u groups are difficult to distinguish.

FIG. 24A shows that the restriction decreases the accuracy of $\Delta c$-LDP. As discussed above, the restriction yields fewer options for $\Delta c$-LDP that, in turn, force $\Delta c$-LDP to select less-optimal alternate paths.

FIG. 24B reveals a similar trend. Without intending to be bound by theory, because there are fewer paths to pick from, it is more likely that these paths will have longer lengths. Additionally, since the restriction prevents a path from immediately turning around, $\Delta c$-LDP must traverse loops requiring roundabout paths. By the time there are twelve links, however, $\Delta c$-LDP with restrictions performs on par with $\Delta c$-LDP without restrictions.

FIG. 24C reveals yet another similar trend. Because the restricted $\Delta c$-LDP created more round-about paths, the paths have more hops. Each hop in a path requires at least one additional iteration. Once again, adding more links diminished the effect.

Simulation Result Discussion

The performance of $\Delta c$-LDP is greatly affected by the Mean Link Delay and Target $\Delta c$ variables. In general, varying link costs (delays) is good, but Target $\Delta c$ should not exceed about three times the cost of the fastest link in the network, unless there are restrictions in place to prevent fast links from being overused. Generally, route restrictions should be avoided.

$\Delta c$-LDP seeks to find the alternative least-cost path whose cost is at least Target $\Delta c$ greater than the optimal path. The presence of additional links offer more opportunities for $\Delta c$-LDP to optimize paths. On the other hand, additional links generate more intermediate paths that consume router memory and increase path computation time. Balancing available resources, resilience to link failure and path optimization can require trial and error procedures. Finally, while the simulation experiments were conducted using Δc-LDP, the results would hold for all implementations of the Δc Algorithm.

The Distributed Δc Protocol is designed to create optimal and suboptimal routes in general computer and telecommunications networks. The Δc Label Distribution Protocol (Δc-LDP) is an adaption of the Distributed Δc Protocol that is specifically designed to construct hyperspeed label switched paths in MPLS networks, enabling service providers to implement sophisticated reactive defense mechanisms. Simulation experiments of Δc-LDP for a variety of network and protocol configurations demonstrate that it operates well for practice values of Δc with respect to average link costs (delay).

Implementation

Using the foregoing description, one embodiment of the invention communicates a signal, or packet 25, across network 10 ahead of a lower-priority signal, or packet 25. The invention comprises the step of assessing each signal, or packet 25, as it enters network 10 at node 12, origination node 12 or source node 12. Origination node 12 and source node 12 may be referred to as origination point and source point. The final node 12 is also termination node 12, which is also referred to as the termination point. The assessing step employs filters 36 and/or detectors 40.

The signal, or packet 25, is analyzed as part of the assessing step. After assessing each signal, a priority is assigned to the signal. At least one path 18 is a high-priority path 18, and the signal, or packet 25, may use this high-priority path 18 if the assessment deems it is necessary.

If a fast preliminary assessment is used, it may deem a signal, or packet 25, more or less harmful or suspicious prior to assigning a priority thereto. Most signals entering network 10 from outside are deemed to be suspicious solely because they come from outside network 10. In the event one or more of the signals, or packets 25, are assessed to be harmful, suspicious or malicious, a lower-priority is assigned thereto. Signals, or packets 25, coming from inside network 10 (e.g., command and control packets 10 that are part of the defensive techniques or from network administrators) are typically assigned high-priority (hyperspeed).

After the preliminary assessment, the signal, or packet 25, is assigned a priority and allowed to enter network 10. As the signal, or packet 25, travels toward its destination, the complete assessment is still taking place at detectors 40. If the complete assessment determines that the signal, or packet 25, is indeed malicious, a high-priority signal is immediately generated and transmitted. Because the high-priority sentinel signal travels at "hyperspeed" and the malicious packet travels at "normal" speed, the sentinel signal will arrive at the destination first and destroy the malicious packet. Other signals, or packets 25, are assigned a high-priority if the nature of the signal warrants such a priority.

In one embodiment, each high-priority signal and each low-priority signal comprise a plurality of packets 25. Each packet 25 is encrypted and/or encapsulated in another packet 25, and then each packet 25 is transmitted along the optimal communications path 20 to a stage point, where it is converted to its original form and forwarded further along a normal path 20.

In another embodiment, a plurality of optimal communications paths 20 are employed. Packets 25 are fragmented and the fragments are teleported along a plurality of optimal communications paths 20. As previously discussed packet 25 may be an Internet Control Message Protocol packet 25.

Although, it is preferred to reserve the optimal path 20 for high-priority signals, there may be defensive techniques that require use of an optimal path 20.

At least one technique is identified and selected for network 10. The service differentiation techniques discussed above provide for a group of defensive techniques from which one or more may be selected and implemented. The service differentiation techniques are selected from a group consisting of a queue priority, a delay variation, a route variation, or combinations thereof. Defensive techniques are selected from the group consisting of precognition, distributed filtering, teleporting packets, quarantining network devices, tagging and tracking suspicious packets, projecting holographic network topologies, transfiguring networks, and combinations thereof. The overall defensive strategy may include a combination of techniques, at least one selected from each group of service differentiation techniques and defensive techniques.

In one embodiment, the optimum defensive technique is defined by using the steps of assessing, analyzing and selecting, which embody the foregoing discussions on defensive techniques. As part of the identifying step, a defensive technique for exploiting a reaction window associated with the signals is selected.

A plurality of electronic communication paths 20 are defined for network 10. Each path 20 is capable of carrying a plurality of signals, or packets 25. While defining the plurality of paths 20, at least one optimal communication path 20 and at least one suboptimal communication path 20 corresponding with the selected defensive technique are identified. The high-priority signal is communicated along the optimal communication path 20 where it is delivered to the desired destination prior to delivery of any of the lower priority signals. The lower-priority signals are communicated along suboptimal communication routes 18 or paths 20. In one embodiment, the high-priority signal delivers a signal, packet 25, acting as a sentinel message to at least the termination point within the reaction window to enable the deployment of a defensive technique.

During the analyzing step discussed above, marketable data is identified. The marketable data identifies the type of data contained in the signal, or packet 25, and associates that data with the type of use. Marketable data is selected from the group consisting of online games, music, video, telecommunications, video communications, streaming video, cloud computing services and applications, business communications, network command, control and optimization, or combinations thereof.

The invention provides for an embodiment with flexible electronic communication of high-priority signals, or packets 25, using a method that is suitable for communicating a plurality of signals across network 10. In this case, network 10 has a plurality of electronic communications paths 20 and each signal has a signal priority. The signal priorities range from high-priority to low-priority. The variety of electronic communications paths 20 provide for part of the flexibility of the invention. Similarly, the plurality of defensive techniques provide for flexibility. Adaptability of the invention to different threats, such as harmful threats, malicious threats or suspicious threats provides for additional flexibility.

A priority is determined for each signal, and, when required, at least one signal is a high-priority signal. A defensive technique is selected, thereby defining the plurality of paths 20 for electronically communicating the signals. One or more of the previously discussed selected service differentiation techniques are employed to optimize the electronic communication of the high-priority signal along at least one of paths 20, thereby providing delivery of a transmitted high-priority signal faster than transmitted lower-priority signals to a desired destination. Defensive techniques are discussed above.

Another embodiment to delivering high-priority signals over network 10 faster than lower-priority signals is described as part of this invention. In this embodiment, a plurality of paths 20 are identified. Each of the plurality of paths 20 are ranked from an optimal path 20 to at least one suboptimal path 20, wherein each path 20 includes an origination node 12 and a termination node 12. A reaction window is identified and defines a desired time difference between optimal path 20 and suboptimal paths 20. Optimal path 20 and at least one suboptimal path 20 are selected from the plurality of paths satisfying the reaction window. The selecting of optimal path 20 and at least one suboptimal path 20 are determined by the reaction window for each origination node 12 and termination node 12. The high-priority signal is delivered from origination node 12 to termination node 12 along the selected path 20.

The embodiment includes a step of selecting a plurality of suboptimal paths 20 that satisfy the reaction window, and a step of selecting a suboptimal path 20 having the smallest reaction window. As part of the identifying a reaction window, each path 20 at each node 12 in network 10 is identified, where nodes 12 are between origination node 12 and termination node 12. From this identification of each path 20 at each node 12, optimal path 20 and suboptimal paths 20 for each node 12 are also identified. Once paths 20 are identified at each node 12, the ranking step further ranks each optimal path 20 and suboptimal path 20 from each node 12. The identity of optimal and suboptimal paths 20 across the network 10 are continuously updated, thereby maintaining a ranked set of optimal paths 20 and suboptimal paths 20.

In the foregoing embodiments, network 10l is selected from the group consisting of local area networks, service provider networks, enterprise networks, the Internet, cloud infrastructures, and combinations thereof. The foregoing embodiments are also applicable to almost any network. Some non-limiting examples include networks having video content providers, market traders, commodities traders, music providers, etc.

Another non-limiting example implementing an embodiment of the inventive method is illustrated in FIG. 25 and described hereinbelow. FIG. 25 is a modified version of the MPLS network illustrated in FIG. 2 and depicting the application of the route variation service differentiation technique. Using the Δc Algorithm of Equation 1 and the Distributed Δc Protocol of Equation 2, the network administrator programs the network control system to operate as described in the illustrative example.

Applying the route variation technique via the Δc-LDP of Equation 8, at least two MPLS Label Switched Paths 20 (LSPs) are constructed from Label Edge Router (LER) 14A to LER 14F. Two examples of the numerous paths 20 that may be constructed in network 10 are presented in this example. The optimal (hyperspeed) path 20A is the path A-B-C-F, representing the label switched paths (LSPs) through LER 14A, label switching router (LSR) 14B, LSR 14C, and LER 14F, in that order. Similarly, the suboptimal path 20B (reserved for normal and suspicious traffic) is the path of A-D-E-F, where D is LSR 14D, and E is LSR 14E.

In this non-limiting example, the selected defensive technique is egress filtering, so hub 41 with three attached detectors 40A, 40B, and 40C is placed before LER 14A. The slowest detector, illustrated by detector 40B for this example, requires about 50 milliseconds to complete an examination, and the delay from detector 40B to LER 14A is about 3 milliseconds. Thus, the target Δc is 53 milliseconds.

Optimal path 20A, the path of A-B-C-F, has a delay of about 30 milliseconds, and suboptimal path 20B, the path of A-D-E-F, has a delay of about 85 milliseconds, giving an actual Δc of about 55 milliseconds for traffic traveling from LER 14A to LER 14F. Note that a similar configuration would exist for traffic traveling from LER 14F to LER 14A to thwart attacks from site 24B to site 24A, but these details are omitted in this example for brevity.

In the non-limiting example, an attacker with access to site 24A sends malicious traffic to site 24B in attempt to gain access to site 24B. The malicious traffic, in the form of malicious packet 25, takes route 18B which is suboptimal path 20B, whereby it passes hub 41 and enters network 10 via LER 14A at time=0 milliseconds. At this point, network 10 is not aware that the traffic is malicious. Hub 41 sends copies of the traffic to each detector 40A, 40B, and 40C. All three detectors 40 begin examining the traffic simultaneously at time=0 milliseconds, because the delay from hub 41 to each detector 40 is the same as the delay from hub 41 to LER 14A. In this example, detector 40C determines that the traffic is malicious after about 20 milliseconds of examination, which is at time=about 20 milliseconds, so it immediately sends sentinel message 35 to LER 14F. Sentinel message 35 takes optimal path 20A, which is the hyperspeed path and route 18A. The delay for sending sentinel message 35 from detector 40C to LER 14A is about 3 milliseconds, so sentinel message 35 enters network 10 at time=about 23 milliseconds. The delay of path 20A is 30 milliseconds, so sentinel message 35 arrives at 14F at time=about 53 milliseconds. LER 14F records the traffic identifier provided by sentinel message 35. The delay of suboptimal path 20B is about 85 milliseconds, so malicious packet 25 arrives at LER 14F at time=about 85 milliseconds, which is about 30 milliseconds after the arrival of sentinel message 35. LER 14F quickly identifies the malicious packet 25 and destroys it, thereby preventing it from affecting site 24B.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

We claim:

1. A method for communicating a high-priority signal across a network ahead of a lower-priority signal, the method comprising the steps of:
   assigning a priority to each signal entering the network;
   analyzing each signal to determine the priority of each signal;
   identifying a harmful signal associated with any of the signals entering the network as each signal travels toward its desired destination;
   generating a high-priority signal in response to the identification of said harmful signal;
   identifying and selecting at least one service differentiation technique for the network;
   defining a plurality of electronic communication paths, each path capable of carrying a plurality of signals, wherein the step of defining the plurality of paths identifies at least one optimal communication path and at least one suboptimal communication path corresponding with the selected service differentiation technique;

establishing a target reaction window, wherein the target reaction window defines a desired time difference between the at least one optimal communication path and the at least one suboptimal communication path; and delivering, within the target reaction window, the high-priority signal along the optimal communication path to the desired destination prior to delivering any of the lower-priority signals along said at least one suboptimal communication path to the desired destination to enable deployment of the selected defensive technique, wherein the step of identifying and selecting at least one service differentiation technique for the network includes selecting a defensive technique for exploiting the target reaction window.

2. The method of claim 1, wherein at least one of the service differentiation techniques is a queue priority technique.

3. The method of claim 1, wherein at least one of the service differentiation techniques is a delay variation technique.

4. The method of claim 1, wherein at least one of the service differentiation techniques is a route variation technique.

5. The method of claim 1, further comprising the step of selecting optimum service differentiation techniques from the group consisting of a queue priority, a delay variation, a route variation and combinations thereof.

6. The method of claim 1, wherein the step of analyzing identifies marketable data.

7. The method of claim 6, wherein the marketable data is selected from the group consisting of online games, music, video, telecommunications, video communications, streaming video, cloud computing services and applications, business communications, network command, control and optimization, or combinations thereof.

8. The method of claim 1, further comprising the step of defining an optimum service differentiation technique using the steps of assessing each signal entering the network, analyzing each signal to determine the priority of each signal and selecting at least one service differentiation technique for the network.

9. The method of claim 1, wherein the defensive technique is selected from the group consisting of precognition, distributed filtering, teleporting packets, quarantining network devices, tagging and tracking suspicious packets, projecting holographic network topologies, transfiguring networks, and combinations thereof; wherein teleporting packets enables packets to be transported by masked routes across the network without detection, and wherein projecting holographic network topologies conceals the network's real topology and projects an illusory topology, and wherein transfiguring networks enables the network topology to be dynamically manipulated.

10. The method of claim 9, wherein each high-priority signal and each low-priority signal further comprise a plurality of packets, each packet being encrypted and/or encapsulated in another packet, wherein each packet is transmitted along the optimal communications path to a stage point, where it is converted to its original form and forwarded further along the at least one suboptimal communication path.

11. The method of claim 10, further comprising a plurality of optimal communications paths and further comprising fragmenting the packets, the fragments being teleported along a plurality of optimal communications paths.

12. The method of claim 10, wherein at least on of the plurality of packets is an Internet Control Message Protocol packet.

13. The method of claim 1, further comprising an origination point and a termination point, wherein the high-priority signal delivers a sentinel message to at least the termination point within the target reaction window to enable the deployment of a defensive technique.

14. The method of claim 1, further comprising the step of reserving the optimal path for high-priority signals.

15. The method of claim 1, wherein the network is selected from the group consisting of local area networks, service provider networks, enterprise networks, the Internet, cloud infrastructures, and combinations thereof.

16. A method for flexible high-priority electronic communication suitable for communicating a plurality of signals across a network, the network having a plurality of electronic communication paths and each signal having a signal priority, the method comprising the steps of:

determining a priority for each signal entering the network;

generating a high-priority signal in response to detection of a harmful signal, wherein the assigned priority of the harmful signal is lower than the high-priority signal;

selecting at least one service differentiation technique for a target reaction window, wherein the step of selecting said at least one service differentiation technique defines the plurality of paths for electronically communicating the signals; and employing one or more of the selected service differentiation techniques to flexibly optimize the electronic communication of the high-priority signal along at least one of the paths to provide delivery of a transmitted high-priority signal faster than transmitted lower-priority signals to a desired destination within the same target reaction window.

17. The method of claim 16, wherein at least one of the service differentiation techniques is a queue priority service differentiation technique.

18. The method of claim 16, wherein at least one of the service differentiation techniques is a delay variation technique.

19. The method of claim 16, wherein at least one of the service differentiation techniques is a route variation service differentiation technique.

20. The method of claim 19, wherein the route variation sends the lower-priority signals along a path having a greater path time.

21. The method of claim 16, wherein the target reaction window defines a desired time difference between an optimized communication path for the high-priority signal and a greater path time for the lower-priority signal.

22. The method of claim 16, further comprising the step of selecting the service differentiation techniques from the group consisting of a queue priority, a delay variation, a route variation and combinations thereof.

23. The method of claim 16, wherein the step of determining a priority for each signal entering the network comprises the step of analyzing the signal.

24. The method of claim 23, wherein the step of analyzing the signal includes identifying marketable data.

25. The method of claim 24, wherein the marketable data is selected from the group consisting of online games, music, video, telecommunications, video communications, streaming video, cloud computing services and applications, business communications, network command, control and optimization, or combinations thereof.

26. The method of claim 23, further comprising the step of defining an optimum service differentiation technique using the steps of determining a priority for each signal entering the network and selecting at least one service differentiation technique.

27. The method of claim 23, wherein the step of determining a priority for each signal entering the network further comprises selecting a defensive technique for leveraging the target reaction window associated with the signals.

28. The method of claim 27, wherein the defensive technique is selected from the group consisting of precognition, distributed filtering, teleporting packets, quarantining network devices, tagging and tracking suspicious packets, projecting holographic network topologies, transfiguring networks, and combinations thereof; wherein teleporting packets enables packets to be transported by masked routes across the network without detection, and wherein projecting holographic network topologies conceals the network's real topology and projects an illusory topology, and wherein transfiguring networks enables the network topology topology to be dynamically manipulated.

29. The method of claim 16, wherein the network is selected from the group consisting of local area networks, service provider networks, enterprise networks, the Internet, cloud infrastructures, and combinations thereof.

30. A method for delivering high-priority signals over a network faster than lower-priority signals, the method comprising:
identifying a plurality of paths, wherein each path includes an origination node and a termination node;
identifying a reaction window, the reaction window defining a desired time difference between an optimal path and at least one suboptimal path;
selecting from the identified plurality of paths, the optimal path and at least one suboptimal path from the plurality of paths satisfying the reaction window, wherein the selecting step is determined by the reaction window for each origination node and termination node, and wherein the selecting step is determined based on at least one service differentiation technique in response to harmful signals; and
delivering the high-priority signal from the origination node to the termination node along the selected optimal path before the lower-priority signal arrives at the termination node from the origination node along said at least one suboptimal path, wherein the lower-priority signal includes a harmful signal.

31. The method of claim 30, further comprising selecting a plurality of suboptimal paths satisfying the reaction window.

32. The method of claim 31, further comprising selecting a suboptimal path having the smallest reaction window.

33. The method of claim 30, wherein the identifying a plurality of paths step further comprises identifying each path at each node in the network, the nodes being between the origination node and termination node, wherein the optimal path and suboptimal paths for each node are identified therefrom.

34. The method of claim 33, further comprising the step of ranking each identified optimal path and suboptimal path from each node.

35. The method of claim 30, further comprising the step of continuously updating the identity of optimal and suboptimal paths across the network, thereby maintaining a ranked set of optimal paths and suboptimal paths.

* * * * *